(12) United States Patent
Dixit

(10) Patent No.: US 10,725,463 B1
(45) Date of Patent: Jul. 28, 2020

(54) HIGH FREQUENCY SENSOR DATA ANALYSIS AND INTEGRATION WITH LOW FREQUENCY SENSOR DATA USED FOR PARAMETRIC DATA MODELING FOR MODEL BASED REASONERS

(71) Applicant: Northrop Grumman Systems Corporation, Falls Church, VA (US)

(72) Inventor: Sunil Dixit, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/583,678

(22) Filed: Sep. 26, 2019

Related U.S. Application Data

(63) Continuation-in-part of application No. 16/163,726, filed on Oct. 18, 2018.

(51) Int. Cl.
*G05B 23/02* (2006.01)
*B64D 45/00* (2006.01)
*G06F 17/15* (2006.01)
*G06N 3/04* (2006.01)

(52) U.S. Cl.
CPC ......... *G05B 23/0232* (2013.01); *B64D 45/00* (2013.01); *G06F 17/15* (2013.01); *G06N 3/04* (2013.01); *B64D 2045/0085* (2013.01)

(58) Field of Classification Search
USPC ....................................................... 701/29.1
See application file for complete search history.

(56) References Cited

U.S. PATENT DOCUMENTS

| | | | |
|---|---|---|---|
| 6,208,955 B1 | 3/2001 | Provan et al. | |
| 7,457,785 B1 | 11/2008 | Greitzer | |
| 8,838,324 B2 * | 9/2014 | Suzuki | E02F 9/2025 701/29.1 |
| 8,855,943 B1 * | 10/2014 | Matsui | G01M 5/0033 244/1 R |

(Continued)

OTHER PUBLICATIONS

International Search Report in related U.S. Appl. No. PCT/US19/43362, dated Nov. 8, 2019, 11 pages.

*Primary Examiner* — Kenneth J Malkowski
(74) *Attorney, Agent, or Firm* — McCracken & Gillen LLC

(57) ABSTRACT

A method implemented by a computing system identifies anomalies that represents potential off-normal behavior of components on an aircraft based on data from sensors during various modes of operations including in-flight operation of the aircraft. High-frequency sensor outputs monitor performance parameters of respective components. Anomaly criteria is dynamically selected and the high-frequency sensor outputs are compared with the anomaly criteria where the comparison results determine whether potentially off-normal behavior exists. A conditional anomaly tag is inserted in the digitized representations of first high-frequency sensor outputs where the corresponding comparison results indicate potentially off-normal behavior. At least the digitized representations of the first high-frequency sensor outputs containing the conditional anomaly tag are sent to a computer-based diagnostic system for a final determination of whether the conditional anomaly tag associated with the respective components represents off-normal behavior for the respective components.

7 Claims, 14 Drawing Sheets

(56) References Cited

U.S. PATENT DOCUMENTS

| | | | |
|---|---|---|---|
| 2005/0212523 A1* | 9/2005 | Chang | G01R 31/2829 |
| | | | 324/511 |
| 2006/0064291 A1 | 3/2006 | Pattipatti et al. | |
| 2008/0312783 A1 | 12/2008 | Mansouri et al. | |
| 2015/0149119 A1* | 5/2015 | Fansler | G05B 23/0221 |
| | | | 702/189 |
| 2019/0147670 A1* | 5/2019 | Chopra | G07C 5/0808 |
| | | | 701/29.1 |

* cited by examiner

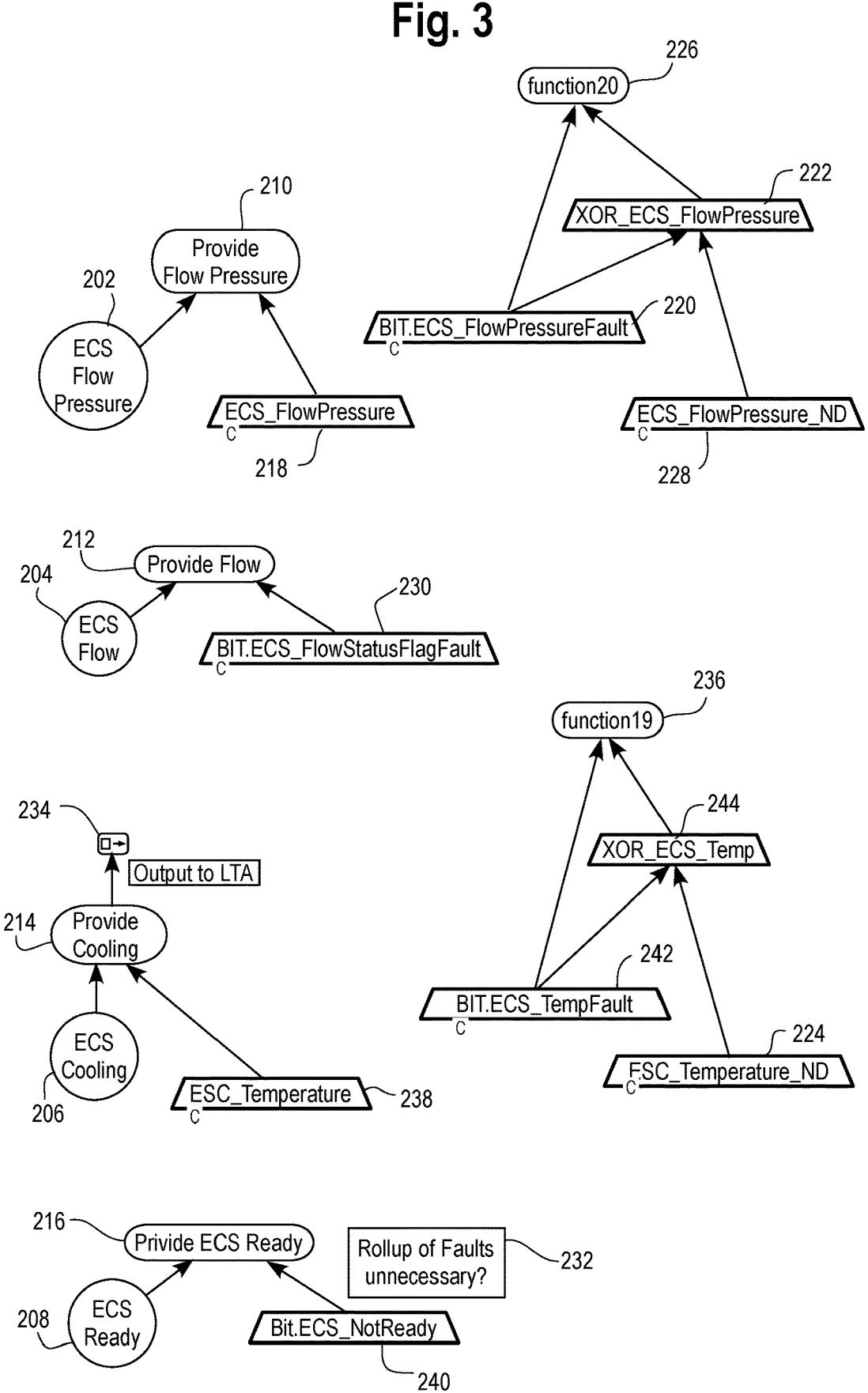

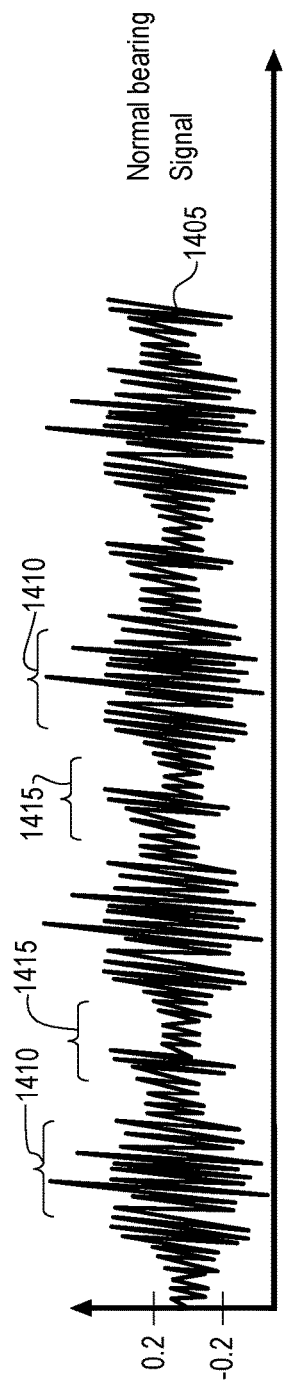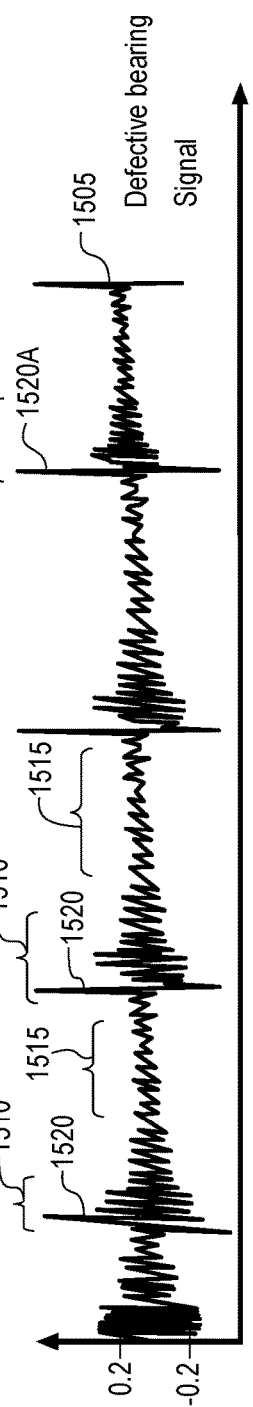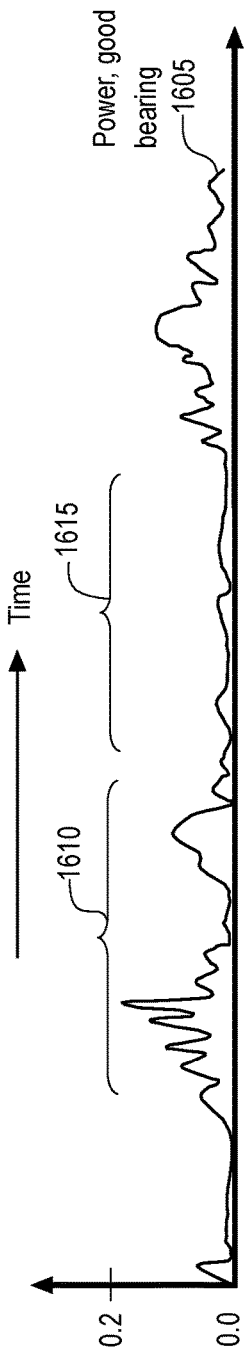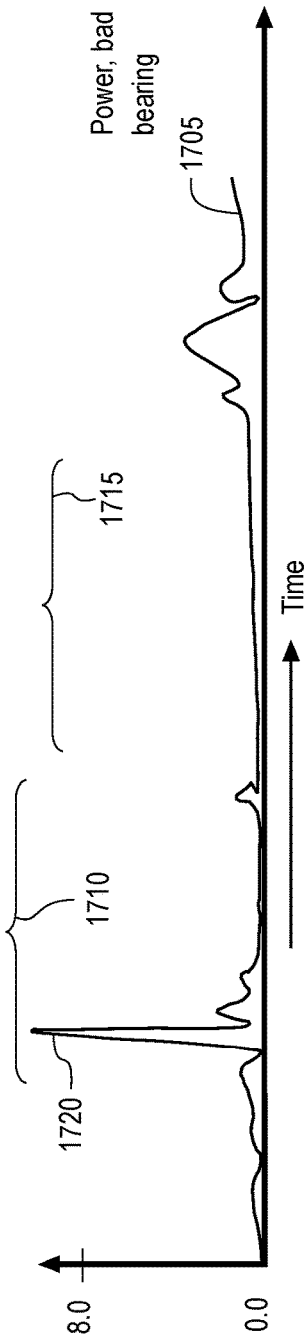
Fig. 14
Fig. 15
Fig. 16
Fig. 17

HIGH FREQUENCY SENSOR DATA ANALYSIS AND INTEGRATION WITH LOW FREQUENCY SENSOR DATA USED FOR PARAMETRIC DATA MODELING FOR MODEL BASED REASONERS

RELATED APPLICATION(S)

This patent application is a continuation-in-part of U.S. application Ser. No. 16/163,726 filed on Oct. 18, 2018.

TECHNICAL FIELD

Various example embodiments relate generally to high frequency sensor data analysis and integration with low-frequency sensor data such as may be utilized in model-based diagnosis systems with Built-in-Test (BIT) input data, and more particularly to parameterized input data to a Model Based Reasoner (MBR) engine and diagnosis of equipment failures and degradation in an Integrated Vehicle Health Management (IVHM) system.

BACKGROUND

Complex systems, such as vehicles, aircraft, spacecraft and other systems, typically include many subsystems for controlling and managing the vehicle and performing missions. Throughout the specification, it should be understood that a reference to a vehicle encompasses a variety of complex systems. It is desirable to identify adverse events or failures and degradation that may be occurring in one or more of these subsystems, particularly during real-time operation of the ground or air vehicle. Integrated Vehicle Health Management systems may be used to monitor, and diagnose various characteristics (failure modes, equipment usage, degradation events) of the vehicle. Model-based systems using models, rules, decisions, and cases (i.e., expert systems) about system behavior have been developed to create a functional model of a system that receives and evaluates inputs from sensors and other data sources within the vehicle and compares observation with the model blueprint to deliver diagnostics. However, prior art models are integrated only at a subsystem, e.g. component, level instead of encompassing an entire vehicle. In addition, a large amount of time, resources, and budget are required to develop and update the model in response to hardware and software upgrades over the life-cycle of the vehicle.

A rules based approach to engineering diagnostics solutions may use built-in test (BIT) data. BIT Engineering (considered to be fixed rules based approach) is not very effective for complex systems and is the main reason for high false alarm (FA) rates observed in various vehicle modes of operation. The engineering effort involved in producing good rules is very costly and unaffordable in software and hardware upgrades over decades; therefore, the costs of maintaining these systems is immense—nearly 72% of the life-cycle cost goes in operations and support. This increases the sustainment cost required to maintain vehicles over their lifecycle. In addition, equipment BIT information may be supplied by different vendors and generally does not follow a consistent standard. Environment conditions play an important role in equipment usage and mission planning. For instance, high dragging winds may cause equipment to be used in excessive operational modes (increasing vibrations, temperatures, wear and tear in rotating mechanisms, etc.) causing early degradation and decrease in remaining useful life (RUL) of the equipment. Large gravitational forces can cause diminished structural integrity, loss of future capability, and downtime for repair and replacement. BIT information is not effective in taking such varying environmental conditions, mission profiles, and structural integrity into consideration.

The sensor data associated with some sensors, e.g. pressure, temperature, volume, flow, etc., is normally produced at a relatively low data rates, i.e. low frequency, e.g. 1 Hz-50 Hz. Because of the relatively low data rate of information provided by such sensors, the processing of this information, even where information must be processed in parallel from several such sensors, can be easily handled by modern microprocessors. However, there exists a need to accommodate the processing and analysis of information from other sensors that have a high frequency data output rate, e.g. in the kilohertz to low megahertz range. Current vehicle systems do not adequately handle high frequency sensors, especially in payloads, structures, and non-critical mechanical components.

SUMMARY

One object of embodiments of the present invention is to satisfy the need for processing and analysis of information from sensors having a high frequency data output rate while also being able to integrate such processed information with information obtained from low-frequency sensors.

An exemplary method implemented by a computing system identifies anomalies that represents potential off-normal behavior of components on an aircraft based on data from sensors during in-flight operation of the aircraft. High-frequency sensor outputs monitor performance parameters of respective components. Anomaly criteria is dynamically selected and the high-frequency sensor outputs are compared with the anomaly criteria where the comparison results determine whether potentially off-normal behavior exists. A conditional anomaly tag is inserted in the digitized representations of first high-frequency sensor outputs where the corresponding comparison results indicate potentially off-normal behavior. At least the digitized representations of the first high-frequency sensor outputs containing the conditional anomaly tag are sent to a computer-based diagnostic system for a final determination of whether the conditional anomaly tag associated with the respective components represents off-normal behavior for the respective components.

In an embodiment, low-frequency sensor information is integrated with the high-frequency information so that all sensor information that has an interrelated/correlated hierarchy can be used to validate or invalidate potential anomalies indicated by one sensor in the hierarchical group of sensors. That is, a failure of a component associated with a sensor output lower in the hierarchy will propagate and may produce associated sensor output anomalies for sensors higher in the hierarchy. This propagation depends on the functional effects that lower hierarchy faulty component(s) have in directly/indirectly causing the higher hierarchy components to function in an off-nominal behavior (i.e., function improperly according to their expected behaviors).

Example embodiments encompass an integrated vehicle health management system that uses a model-based reasoner to develop real-time diagnostic and maintenance information about a vehicle. In an embodiment, an on-board diagnostic system for a complex system having a computer processor and a non-volatile storage includes an interface for receiving data including sensor data from a plurality of sources including high data rate and low data rate sensors in the complex system; a model representing the complex system, said model further comprising a plurality of nodes in a graph, said nodes representing functions, components, and sensors of the complex system, at least some of said nodes representing parameterized data associated with high frequency and low-frequency sensors, direct analog sensor data and BIT data, said model further comprising an XML model configuration file stored in the non-volatile storage; a model development and verification interface for creating and verifying the model; a model testing manager for evaluating the model; a model based reasoner (MBR) engine executed by the computer processor, said MBR engine receiving data from the input interface, implementing the model from its corresponding XML model configuration file, and producing diagnostic analysis and data for the complex system; and a maintenance viewer for receiving the diagnostic analysis and data and providing actionable maintenance tasks and reports.

In a further embodiment, the model testing manager evaluates the model using simulated data or captured operational data from the complex system.

In an embodiment, a method of integrated vehicle health management (IVHM) for a complex system includes the steps of generating a model representing the complex system, said model further comprising a plurality of nodes in a graph, said nodes representing functions, components, and sensors of the complex system, at least some of said nodes representing parameterized data associated with high frequency and low-frequency sensors, direct analog sensor data and built-in-test (BIT) data; verifying the model; testing the model; exporting the model to an XML model configuration file; executing a model based reasoner (MBR) engine using the model and sensor data from a plurality of sources in the complex system and producing diagnostic analysis and data for the complex system; and performing maintenance of the complex system based on the diagnostic analysis and data.

In a further embodiment, the testing step further includes evaluating the model using simulated data or captured operational data from the complex system.

In a further embodiment, stored maintenance records may be replayed in a Portable Maintenance Device (PMD) Viewer for maintenance, repair and replace determinations. The PMD Viewer may run on a hand held computing-capable device either connected to the vehicle on ground or in off line analysis of the stored maintenance records retrieved from the vehicle by the hand held device. Historical usage data and current operational usage data which depends on mission objectives, mission profiles, and environmental conditions are preferably analyzed offline to perform better future mission planning based on equipment condition and collected for later mission planning refinements.

In any of the above embodiments, at least one node further includes a component node for representing a system element having a state and a status, a function node for logically combining outputs from other nodes, and a physical sensor node for providing parameterized high-frequency and low-frequency data to the model.

In any of the above embodiments, the parameterized data further includes non-static upper and lower bounds on the sensor data. A physics-based approach provides for dynamic thresholds against which the sensor data is contrasted so that a decision can be made whether an anomaly/alarm determination should be made for components sensed by respective sensors. The physics-based approach also determines the validity of the sensor results determining whether the sensor itself has not failed.

In any of the above embodiments, the parameterized data further comprises a calibration value.

In any of the above embodiments, at least one node further comprises a physical sensor node for providing BIT data to the model or a physical sensor node for providing direct physical sensor quantitative high-frequency and low-frequency data to the model.

In any of the above embodiments, a graphical user interface is provided for creating and testing the model representing the complex system.

DESCRIPTION OF THE DRAWINGS

Some example embodiments will now be described with reference to the accompanying drawings in which:

FIG. 3 shows a model of a subsystem for use with the IVHM system.

FIGS. 14 and 15 show exemplary high-frequency sensor data from a vibration sensor for motor bearings in a centrifugal pump showing representative sensor data corresponding to normal and defective pump bearings.

FIGS. 16 and 17 show exemplary high-frequency sensor data from a sensor that monitors electrical power to the centrifugal pump corresponding to power associated with a good bearing and a bad bearing, respectively.

DETAILED DESCRIPTION

Integrated Vehicle Health Management (IVHM) using Model Driven Architectures (MDA) and Model Based Engineering (MBE) is a solution where software and hardware elements are flight qualified once instead of every time the system is changed or upgraded. This results in significant cost savings by using an XML format configuration file containing a model with the diagnostics domain knowledge of the system. The model needs to be verified for accuracy but does not require expensive and time-consuming software flight qualification. This saves between 25%-35% in military operations and support costs.

Figure 1:
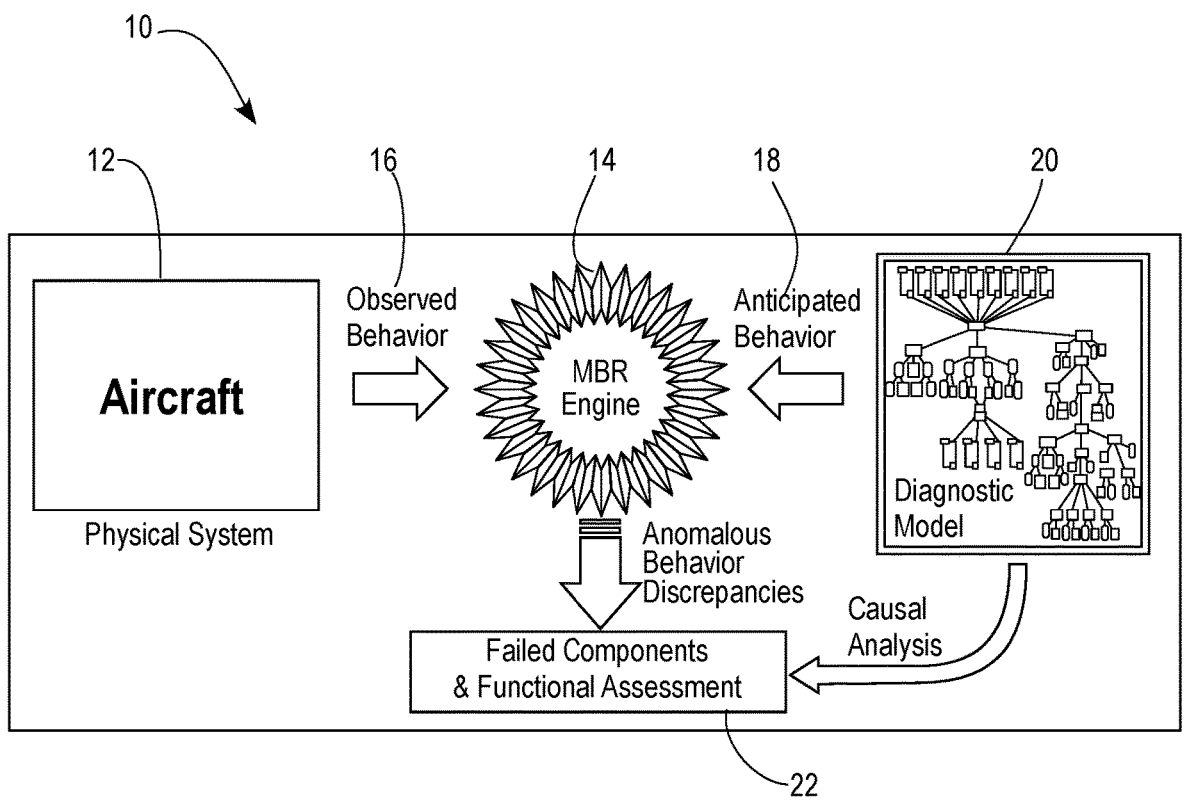
FIG. 1 shows a block diagram of an on-board operational IVHM system and its interfaces for diagnostic analysis of equipment failures in an aircraft.

FIG. 1 shows the functional behavior and interfaces of an IVHM system 10 on aircraft 12 where MBR Engine 14 runs on a computation device (not shown) in an avionics bay of aircraft 12. Although an aircraft is shown and discussed with reference to FIG. 1, embodiments are not limited to this type of vehicle. Observed behavior 16 refers to the sensor data in BIT, parametric, analog, and discretes obtained from various aircraft avionics data buses. Anticipated behavior 18 refers to what is expected from the modeled domain knowledge 20 of the various subsystems, line replaceable units (LRUs), and components of entire system (this model is represented in XML format). Component refers to subsystems, LRUs, and components. When observed behavior 16 is different from the anticipated behavior 18 anomalous behavior (discrepancies/residues) is registered and MBR Engine 14 goes into a diagnostics mode (causal analysis). With various reasoning algorithms and analysis of the BIT, parametric, and sensor data MBR Engine 14 produces results 22 that include detection of failed components; isolation to a single failed component or an ambiguity group of similar components; false alarm identification; functional assessment of the failed component (i.e., leakage in a pump, leakage in a pipe, blockage of air flow, bearing damage, and other assessments dependent on the physics of the component); and unknown anomalies. In case of an unknown anomaly, model 20 is refined with additional information on the component and its interactions with other components related to its failure modes. This information is obtained from the manufacturers of these components and additional failure modes are added to the existing model. To reduce the ambiguity group of similar elements in a chain (series or parallel), typically additional sensors are required to isolate to a specific component within the ambiguity group. If additional sensors cannot be applied due to size, weight, and power limitations the maintainer must perform off-board diagnostics analysis within the localized ambiguity group.

Figure 2:
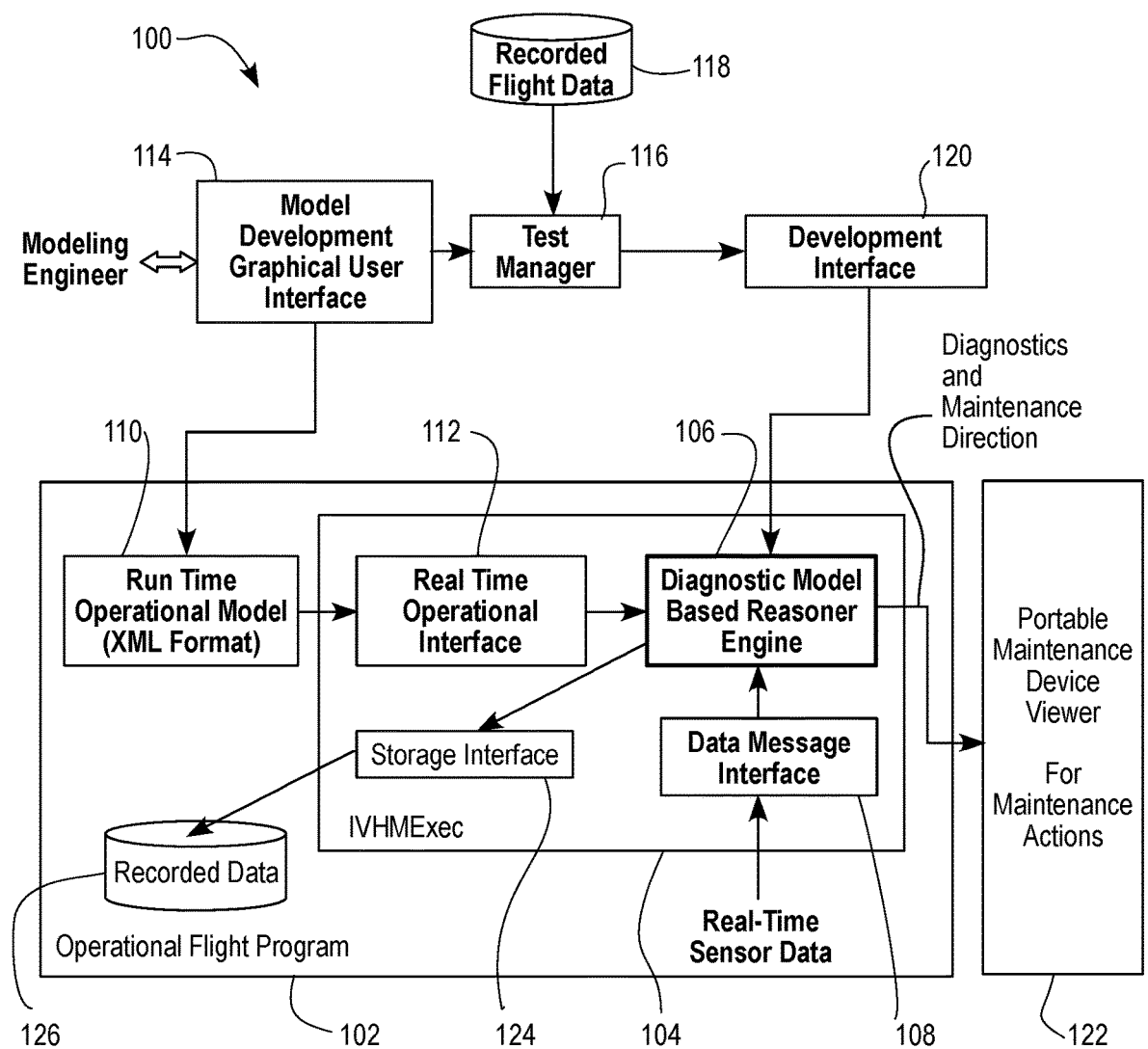
FIG. 2 shows a block diagram of design, operations, and maintenance processes & interfaces of the IVHM system.

FIG. 2 shows a block diagram of an IVHM system 100. The various components of FIG. 2 are linked together to logically combine their interconnected functions, failure modes, failure probabilities, and functional assessments in the modeled system, and also linked to sources of design (114, 116, 118, 120), real-time or post-processed input data distributed to the pilot's display (obtained from Operational Flight Program 102), ground systems (obtained from OFP 102), and storage on disk (126) for maintainer's on-ground maintenance actions 122. For discussion purposes, IVHM system 100 is represented as a block diagram but the functions and methods described maybe logically combined in hardware components in a variety of ways.

Operational Flight Program (OFP) 102 encompasses hardware and software for managing the overall operation of the vehicle. OFP 102 includes a runtime diagnostics engine IVHMExec 104. OFP 102 may also be implemented as a standalone avionics IVHM computer attached passively to the avionics data buses, actively interfaced with mission planning systems, and actively interfaced with ground systems and maintenance systems 122. IVHMExec 104 includes a diagnostic Model Based Reasoner (MBR) Engine 106. MBR Engine 106 combines a physical model of a vehicle system or subsystem with input data describing the system state, then performs deterministic inference reasoning to determine whether the system is operating normally, if any system anomalies exist, and if so, to isolate and identify the locations and types of faults and false alarms that exist. IVHMExec 104 writes maintenance records to a disk 126 that may also be accessed by Portable Maintenance Device Viewer 122.

MBR Engine 106 receives real-time sensor data through Data Message Interface 108 in which high-frequency and low-frequency sensor data are analyzed and integrated together to facilitate the decision-making by MBR engine 106. It also receives a Run Time Operational Model 110 of the vehicle through Real-Time Operational Interface 112. Model 110 of the vehicle is created by a modeling engineer using a Model Development Graphical User Interface (GUI) 114. Model 110 is created and verified with the MBR Engine 106 offline (non-real time) and then exported to an XML file that is used by a real-time embedded build of IVHMExec 104. In addition to creation of model 110, GUI 114 is also used to verify the model. Verification and validation are a test of the model's internal logic and elements, without the use of any specific input data. This process is necessary to ensure that the model is logically consistent, without errors that would prevent it from operating properly or not at all.

As a further step in the model development process, Test Manager 116 evaluates a model by testing it against simulated or actual flight data 118. Development Interface 120 allows for modification and addition of MBR Engine 106 algorithms, which are separate classes statically or dynamically linked to the IVHMExec 104 runtime executable (statically for standalone IVHMExec and dynamically for integration with the Graphical User Interfaces (GUIs)). While verification tests a model logically, Test Manager 116 ensures that the model performance and output is as desired. Once a model is verified and tested, an XML model configuration file 110 is generated.

IVHMExec 104 is the executive that loads the XML representation of the model and executes the MBR Engine 106 in real-time by applying the model to input sensor data messages as they are received from various buses in the vehicle and/or stored history data in various formats for replay on ground. IVHMExec 104 may also be used by Test Manager 116 through Development Interface 120. Storage interface 124 connects MBR Engine 106 to Recorded Data storage 126. Recorded Data 126 includes log files, complete time-stamped state of the equipment, for example, snapshots, time-stamped fault/failure anomalies, detections, isolations, false alarms, and any functional assessments on the isolations. The log files also include the MBR Engine software states (version number, failures & reboots) as well as identification of other aircraft software, their version number, if failed their state at failure, reboots of software, and functional assessments that lead to the failure. Collection of this data allows for the replay of diagnostics visualization of the actual events that occurred on the aircrafts, and allows the maintainer to better understand both hardware and software interactions leading to the failed component(s). Recorded Data storage 126 stores the raw data used by the MBR Engine 106 and the results of its processing.

In an embodiment, MBR Engine 106 includes dynamically calibrated data input capability, and a set of logic gates (intersection AND, union OR, exclusive-or XOR, and others), rules, cases (histories), and decision trees combined in sensor logic for IVHM data fusion of parameterized and direct analog sensor data with corresponding Built-In-Test (BIT) inputs. A comparison of parametric data, direct analog sensor data, and BIT results produce confidence measures in failure and false alarm predictions.

An example of the creation of a model for use by MBR Engine 106 will now be described. In an embodiment, the model provides for data fusion from many sources within a modeled vehicle. In particular, the model may include parameterized data input capabilities that allow MBR Engine 106 to include analog and quantified digital data input, with either fixed or dynamically calibrated bounds to the measured physical quantities to determine the existence of anomalies. The parameterized data anomaly decision can be based on simple fixed bounds, dynamically changing calibration values based on physical sensor operations, or more complex decision properties including signal noise reduction, windowing, latency times and similar parameterized data conditioning. These data calibration parameters and thresholds become sensor node properties for evaluation during real time operations of the system. Functions can be represented as logic sets and operands while rules may be represented as logic sets or natural language semantics, historic behaviors (case based), or decision trees (fault tree analysis). For example, in the case of pressure functions, the model would evaluate whether flow pressure is provided and combine other inputs according to the function logic desired. In an embodiment, each input must indicate a positive result for the function to be evaluated as true although other logic functions may also be used. Various user-defined parameters for this function can be represented as node properties of the function. The XML MBR Model(s) 110 of the vehicle and the binary IVHMExec 104 real time engine running on an avionics computational device provide IVHM capability/functionality for the entire vehicle.

A parametric and BIT MBR model may include components and sensors that are related by their functions. In an embodiment, a model of a vehicle system or subsystem may be represented as nodes in a graph as shown in FIG. 3. In particular, FIG. 3 shows an example of an environment control subsystem (ECS) including both diagnostic or non-diagnostics nodes as it would be represented using the Model Development GUI 114 of FIG. 2. For the purposes of explanation, a specific example will be discussed, however, principles explained herein may be applied to any subsystem or system of a vehicle. A modeling engineer interacts with the model of FIG. 3 through the GUI 114 of FIG. 2.

Diagnostic nodes are used directly in the MBR model reasoning engine to determine the system components causing a fault or false alarm, while non-diagnostic nodes are used for tasks such as sensor output and BIT test comparison. The non-diagnostics nodes are used for real-time comparison of parametric sensor data with BIT data results. The parametric sensors represent the true system behavior (when the sensors have not failed), and if they are operating nominally when the BIT data show failure of corresponding components, this result is shown as a false alarm. Failed sensors are identified from false positive and false negative tests upon the sensors. Components, such as a Flow Pressure component, refer to a specific system element whose state (e.g. on, off, high or low pressure, etc.) and status (operational, failed, leaking, etc.) is indicated by MBR Engine 106, by connecting the component to other elements of the model. Sensor nodes are modeled with input data, which could take many forms, for example, direct sensor analog input, parametric data input and binary BIT data input. Referring to FIG. 3, a representative component node is shown as ECS Flow Pressure sensor node 202. Other component nodes include ECS Flow 204, ECS Cooling 206 and ECS Ready 208.

Figure 3A:
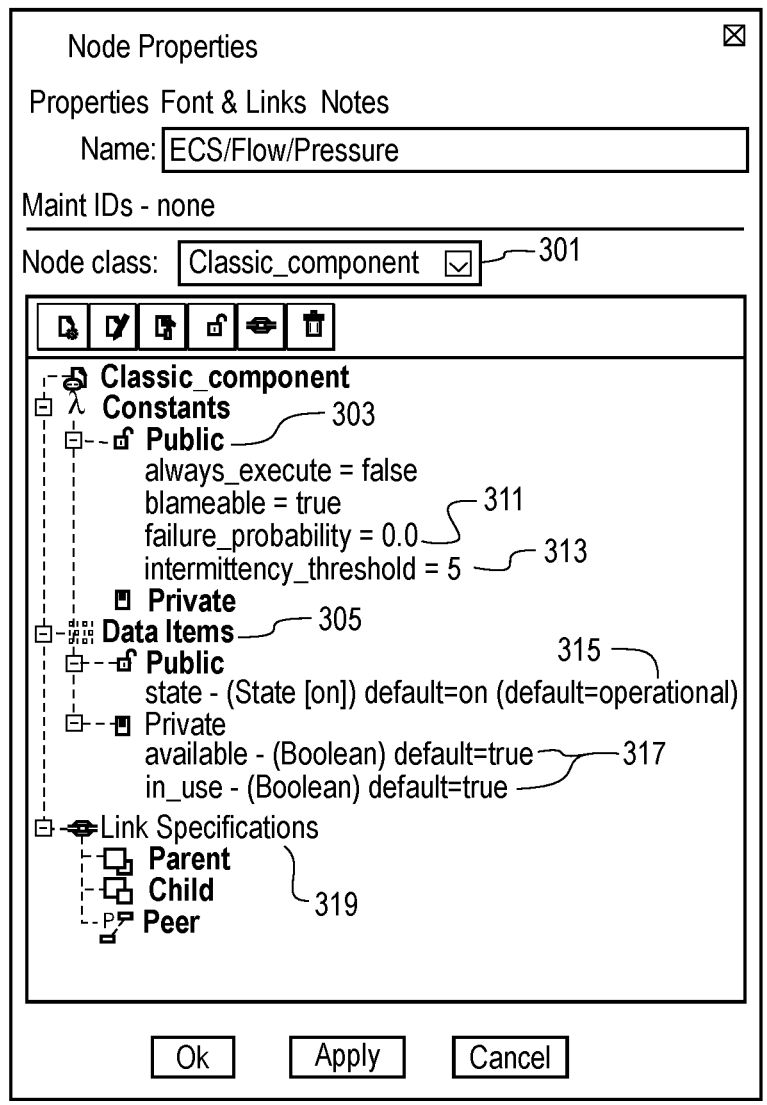
FIG. 3A shows a representation of a component in the model of FIG. 3.

FIG. 3A shows various user-defined parameters for node 202 may be seen by a modeling engineer by double-clicking on the function node icon, which brings up the window shown in FIG. 3A for node 202 (circle). The parameters defined in the Node Properties include the Node Class 301, default parameter values 303, and data items 305 defining the capabilities, output and status data types of node 202. Although specific labels and features are shown in FIG. 3A, these may be varied depending on the function being modeled and the design of a modeled vehicle.

In the default parameter values 303, 311 indicates a failure probability (failure modes) entered from a component supplier with a "0" indicating no supplier data available. Alternatively, the failure probability can be entered from historical performance data. It can be recalculated with degradation events, i.e. the failure probability increases with degradation events. The intermittency threshold 313 refers to a time period of intermittent or random behaviors with an exemplary default value of five seconds. The state 315 defines the various states of the component, e.g. ON, OFF, high-pressure, etc. The available and in use parameters 317 are shown as both being set to "true", i.e. the component is both available and in use. A "false" state in either of the parameters 317 could be due to failure and/or due to other reasons such as loss of power, etc. the link specification 319 specifies links to other components by function nodes.

Figure 4:
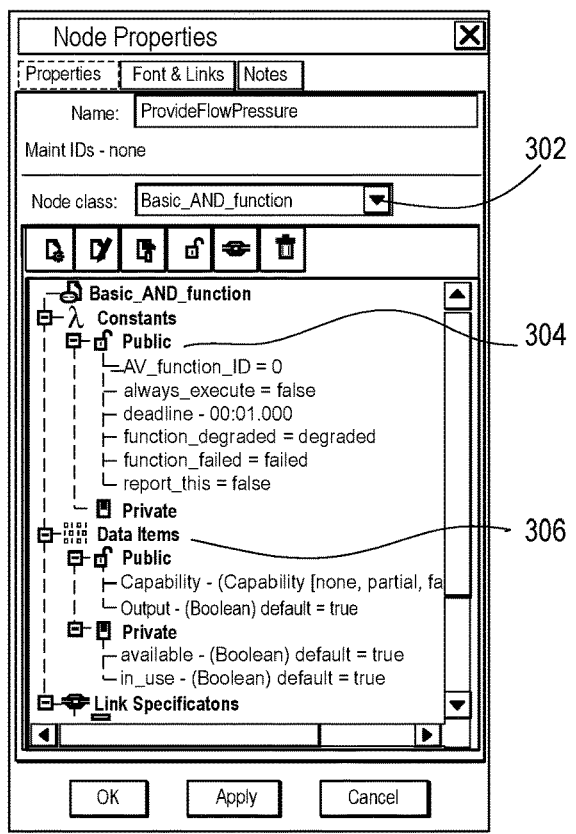
FIG. 4 shows a representation of a function node in the model of FIG. 3.

Another type of node in the model of FIG. 3 is a function node. A representative function node is shown as Provide Flow Pressure node 210. Other function nodes include Provide Flow 212, Provide Cooling 214 and Provide ECS Ready 216. Each of the function nodes in FIG. 3 represent a basic AND function. Provide Flow Pressure 210, for example, is used to determine if flow pressure is provided (logic sets and logic operands), combining other inputs according to the function logic desired. In this example, each input must indicate a positive result for the resulting state of the function to be true. Various user-defined parameters for function node 210 may be seen by a modeling engineer by double-clicking on the function node icon, which brings up the window shown in FIG. 4 for function node 210 (oval). The parameters defined in the Node Properties include the Node Class 302, default parameter values 304, and data items 306 defining the capabilities, output and status data types of node 210. Although specific labels and features are shown in FIG. 4, these may be varied depending on the function being modeled and the design of a modeled vehicle.

Figure 5:
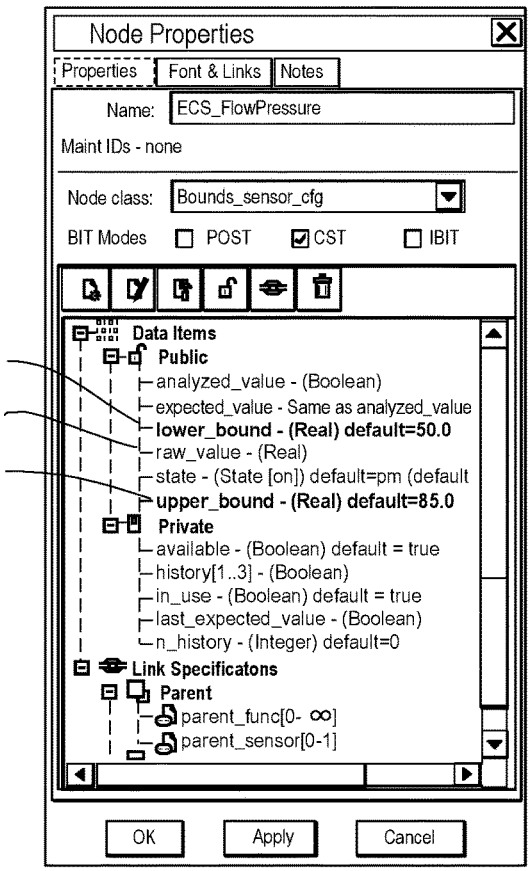
FIG. 5 shows a representation of a sensor node in the model of FIG. 3.

Another type of node in the model of FIG. 3 is a physical sensor node. A representative physical sensor node is shown as ECS_FlowPressure node 218 (trapezoid) in FIG. 3. Another physical sensor node is shown as ECS_Temperature node 238. Physical and virtual nodes are used in the model to indicate input data, which could take many forms. As described above, a modeling engineer interacts with the model of FIG. 3 through GUI 114. Various user-defined parameters for physical sensor node 218 may be seen by a modeling engineer by double-clicking on the node icon, which brings up the window shown in FIG. 5 for physical sensor node 218. For sensor node 218, parameterized input data is used with fixed upper and lower bounds (allowable thresholds) defined as defaults in the Node Properties window shown in FIG. 5. The use of parameterized data allows for direct analysis of quantified sensor values, listed in the sensor Node Properties as raw value 402 as seen in FIG. 5. In this case, the sensor raw value 402 contains the measured flow pressure for the ECS subsystem. If raw value 402 drops below the lower bound 404 or exceeds the upper bound 406, then the sensor indicates an anomaly, which is then used by MBR Engine 106 (FIG. 2) along with the rest of the model to determine the nature and cause of the anomaly (causal analysis FIG. 2).

Another example of a physical sensor node is BIT.ECS_FlowPressureFault 220. This sensor uses Built-In-Test (BIT) data from the modeled system, which indicates either an anomaly or normal operation in the data output. This BIT test is designed to use the same upper and lower bounds as the corresponding parameterized sensor, but could produce a different result in the case of an anomalous operation. As such, we use the BIT test as an input along with a separate parameterized data input, into XOR_ECS_FlowPressure node 222 which is an exclusive logical or (XOR) sensor node. In some cases, only a BIT test sensor may be available to the maintainer; in this case, the BIT test will be used as a diagnostic sensor similar to the parametric sensor node used here for the ECS_FlowPressure 218. Other physical sensor nodes in the model of FIG. 3 include BIT.ECS_NotReady node 240 and BIT.ECS_TempFault node 242.

XOR_ECS_FlowPressure node 222 receives inputs from physical sensor node BIT_ECS_FlowPressureFault 220 and ECS_FlowPressure_ND 228 (nondiagnostics), which is a parameterized input sensor node. The reason that a separate parameterized input sensor is used for the XOR input is because this input is non-diagnostic (no diagnostics cycle performed). Sensors can be either diagnostic, which means that they are used in the MBR engine to determine system faults and false alarms, or non-diagnostic to remove them from the MBR engine assessment. For XOR sensor input, a non-diagnostic parametric sensor input 228 is desirable to prevent interference with the MBR engine, as the XOR logic and output is complementary and separated from the MBR engine processing. In the example used here, the BIT test sensor (BIT.ECS_FlowPressureFault) 220 is also non-diagnostic, for the same reasons. In addition, for XOR sensors, a blank function20 226 is used to fulfill a design requirement that each sensor has a downstream function attached to it. Another blank function (function19) is shown at 236. Similarly, to node 222, XOR_ECS_Temp node 244 receives input from physical sensor node BIT.ECS_TempFault 242 and parameterized sensor node ECS_Temperature_ND 224.

XOR_ECS_FlowPressure node 222 produces a separate output stream, only indicating a positive Boolean result when the connected sensors (the parameterized sensor non-diagnostics node 228 and the corresponding BIT test node 220) provide different assessments. Under normal operating conditions this should not happen, therefore the XOR sensor node is useful to determine when one of the system's BIT or parameterized inputs is providing an anomalous result. This provides the modeler with another tool to diagnose the system's health, which may otherwise be difficult to analyze.

An example of a case where only a BIT test data field is available is shown in FIG. 3 as BIT.ECS_FlowStatusFlag-Fault node 230 which provides sensor input to Provide Flow node 212. In this case, the BIT test node 230 is diagnostic, and used in the MBR Engine directly. Other model element types seen in FIG. 3 include comments shown, for example, as 232, describing model functionality, and output icon 234 which allows for model elements outside (i.e., Outside submodel: "Output to LTA") of those shown in the sub-model shown in FIG. 3 to communicate with the sub-model, specifically the Provide Cooling function node 214.

Figure 6:
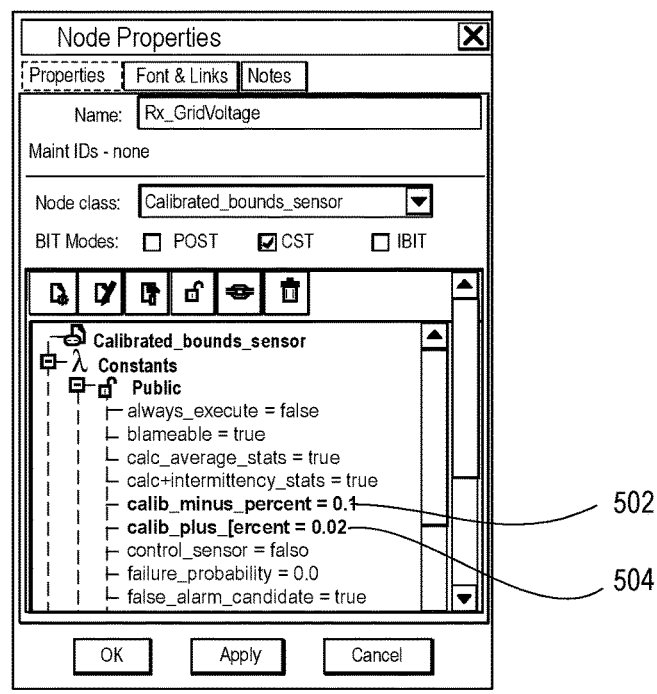
FIG. 6 shows a representation of a calibrated bounds sensor node in the model of FIG. 3.

In some cases, parametric nodes will not have fixed upper and lower bounds. In this case, a separate node class can be used, as shown, for example, in FIG. 6. This node is not part of the subsystem model of FIG. 3. Here, a second input is used which provides a calibration value (for example, a calibration voltage) which may vary over time. The measured value must then fall in a percentage range defined by calib_minus_percent 502 and calib_plus_percent 504 (generally determined from subsystem supplier information) around the calibration value. This type of sensor node can be used in place of Bounds_sensor_cfg class nodes, such as ECS_FlowPressure node 218 of FIGS. 3 and 5, when known calibration values for the limits of a parameterized sensor exist.

Figure 7:
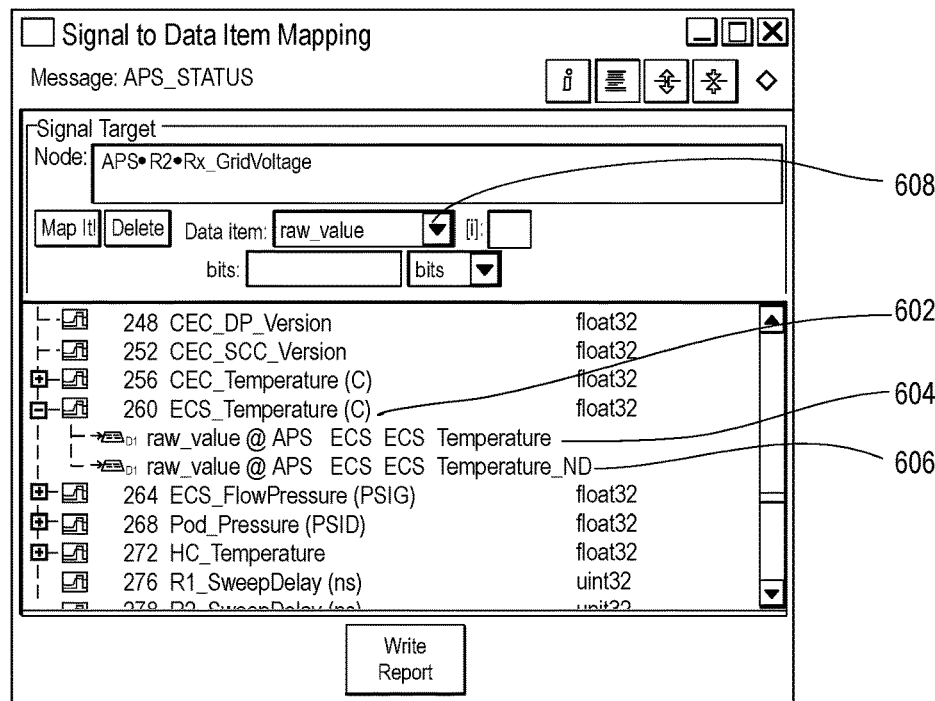
FIG. 7 shows a representation of a data mapping to sensor nodes.

In an embodiment, a model such as that shown in FIG. 3 includes a list of data fields corresponding to each element of the model. For example, as shown in FIG. 7, the ECS_Temperature (C) 602 value is mapped to the diagnostic ECS_Temperature sensor node 604 and non-diagnostic ECS_Temperature sensor node 606 in the ECS_submodule. These are the labels of data columns in a file format used as data input for this model, and allow for all data fields for various sensors in each subsystem to be defined systematically in one file. Separate data items are mapped for BIT test data nodes, and calibration data items for calibrated sensor nodes. The raw value data item selection in the drop-down menu 608 indicates that this example data item is a raw measurement value from the ECS temperature sensor. Each sensor in the model (parametric or BIT) is mapped to a data item, along with any calibration value data sets for calibrated parametric sensors.

Figure 8:
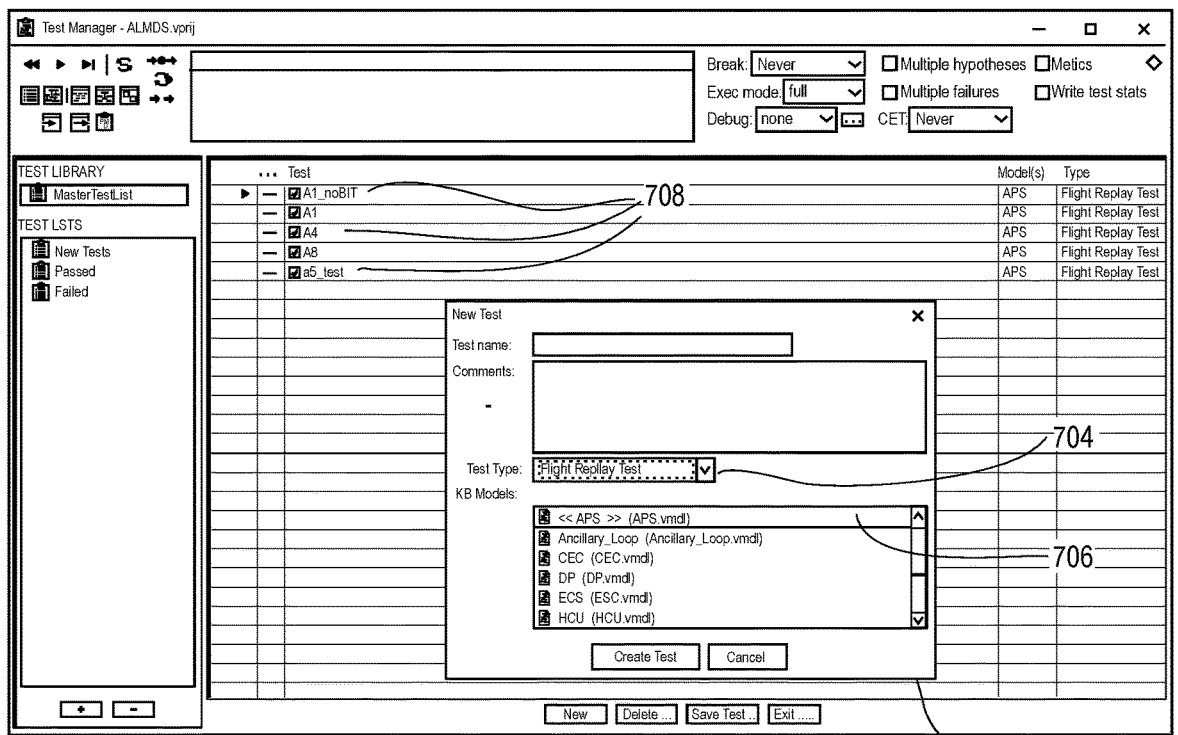
FIG. 8 shows a representation of a mechanism for testing a model for use with the IVHM system.
Figure 9:
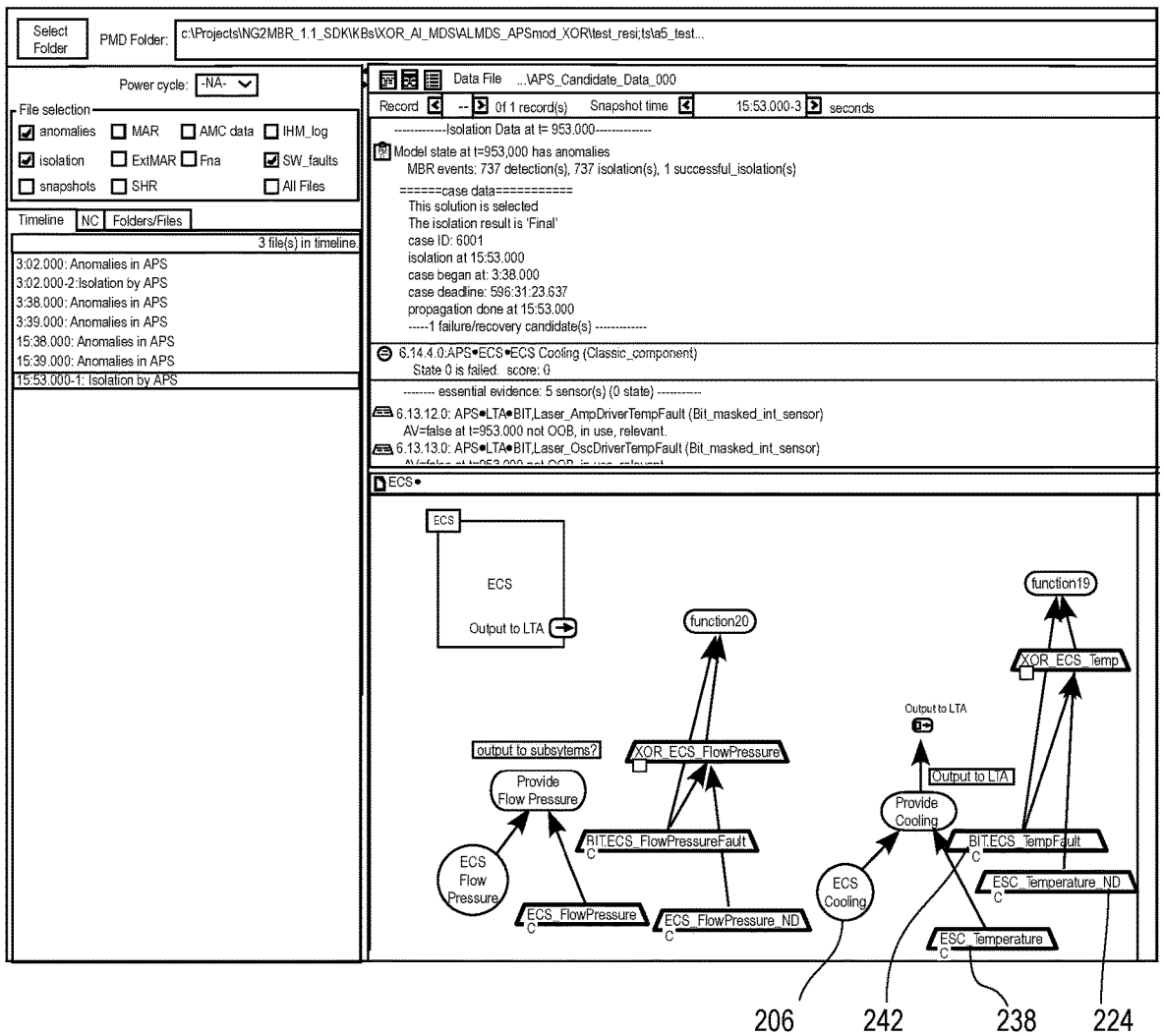
FIG. 9 shows an example of a fault analysis report.

Referring back to FIG. 2, after an IVHM MBR model is built using Model Development GUI 114 (with all sensors, components and functions in place to emulate the operations of each subsystem), there are two methods to run the model using real or simulated system data. As explained above, GUI 114 contains a direct method to run the MBR model using recorded flight data 118 with Test Manager 116. FIG. 8 shows a representative Test Manager window with a New Test pop-up window 702. When Flight Replay Test 704 is selected, a suitable test simulated data or actual flight data file can be selected for the complete system model 706 (or a selection of subsystem models below in the drop down Combobox) by clicking on "Create Test" button, choosing the appropriate file from disk, and loaded into Test Manager 116 in FIG. 2 (note a test name must be entered in the "Test name:" text box; comments describing the test may be entered in the "Comments:" text area box). After a test of the model is run using a data file, an output file is generated and can be viewed with subsequently stored analyzed diagnostics results written as maintenance records (i.e., the maintenance records storage 126 in FIG. 2). Other existing test cases with existing flight data already may be selected from those shown at 708. The specific test result shown in FIG. 9 are representative examples only, and many other tests may also be used to produce such exemplary results.

In an alternative embodiment, a modeling engineer using GUI 114 (FIG. 2) may test a model using a Command Line standalone version of IVHMExec 104 (FIG. 2). For this procedure, an XML (Extensible Markup Language) file containing information about the model and data mapping is generated (i.e., the complete <<APS>> (APS.vmdl) model 706 in FIG. 8 from a different GUI screen not shown). This file can be run with the Command Line standalone version of IVHMExec 104 to generate the output file at a predefined storage location, which can be loaded in PMD data viewer 122 (FIG. 2). This result should be the identical as that generated in the Test Manager 116 (FIG. 2) for the same flight data, but the Command Line procedure allows for batch file processing of large quantities of data sets and varying numbers of system MBR models.

Figure 10:
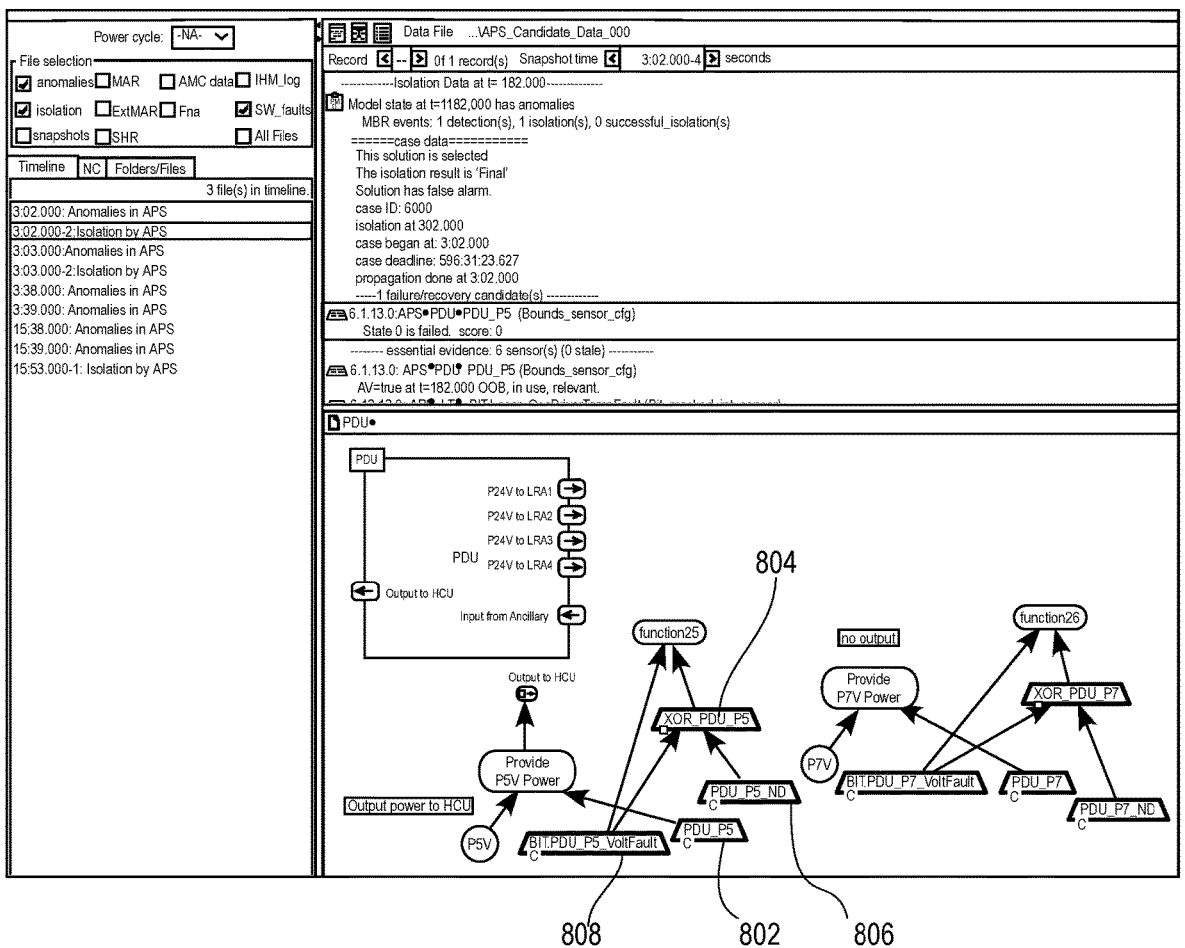
FIG. 10 shows an example of a false alarm report.

An example of output data from a model test is shown in FIG. 10 (PMD Viewer 122 FIG. 2). MBR Engine 106 (FIG. 2) has isolated a fault for the ECS Cooling component, using a fault in both the parameterized ECS Temperature sensor represented as ECS_Temperature node 238 and supporting evidence in other subsystem components including other temperature sensors (in some of these cases, for example, an LTA Laser Amplifier Driver Temperature (not shown), the only data available is a BIT test, hence a BIT test node is used for supporting evidence in this case). The logic of the interconnected subsystems' sub-models as similarly shown in FIGS. 2 and 10 dictates this result when the parameterized sensor ECS_Temperature node 238 measuring the ECS temperature is determined to be an anomaly with appropriate supporting evidence (from other sensor internal to subsystem or external sensors from other subsystem models). In addition, the BIT test BIT.ECS_TempFault node 242 measuring the ECS_Temperature anomaly is separately indicating a fault; this sensor node is non-diagnostic and therefore not used to determine system faults, but it is used as a comparator for the non-diagnostic ECS_Temperature_ND parametric sensor node 224. Variations between the BIT and parametric nodes can indicate a faulty BIT test or sensor, and are one of the capabilities added by implementing parameterized sensors.

FIG. 10 shows an example of an output of MBR Engine 106 generating a False Alarm. In this case the Power Distribution Unit (PDU_P5) sensor 802, a parametric sensor measuring voltage in a PDU sub-model of the system, is generating an anomaly because the data input for this subsystem is out of the defined parametric range. A parametric sensor node implementation allows for direct use of this sensor data, bypassing potentially troublesome hardware BIT test results. Parameterized nodes also allow analysis of quantitative data directly for calculation of confidence measures, windowing the data for spurious data points, and similar analysis. In this sub-model, a comparator analysis using XOR_PDU_P5 node 804 between the parametric node PDU_P5_ND 806 and BIT test data from BIT_PDU_P5_VoltFault 808 is made to determine if there are any discrepancies between these two results which would be indicative of a sensor or BIT test failure. In the example below, the anomaly is determined to be a False Alarm since other subsystems would expect a similar anomaly in the case of an actual fault in the system hardware. As no such other anomaly exists, the MBR Engine 106 is able to determine that this anomaly is a False Alarm (outcome listed in the top right box of FIG. 10) with the component P5V (circle) and sensor node PDU_P5 802 (trapezoid) are highlighted in color purple for false alarm. The other lines shown below this box and above the graphics are timestamped supporting evidence in the false alarm outcome of FIG. 10. Fault isolations color the component and sensor nodes with color red. Function nodes (ovals) are highlighted with color green for "full mission capable (FMC)", color yellow for "partial mission capable (PMC)" where the system is capable in a degraded state, and color red for "non-mission capable (NMC)". Supporting evidence sensors (trapezoids) within the system or external to subsystem are colored blue with an "EE" (essential evidence) tag, providing the complete diagnostics inference propagation path. Function node behavior FMC, PMC, and NMC are recent modification (year 2019) to the MBR Engine 106 and the PMD Viewer 122 in FIG. 2.

The central purpose of the invention is to produce High Fidelity Real Time Diagnostics capability (False Alarm (FA) rejections, Fault Detection (FD), Fault Isolation (FI), and parameter trending for equipment failures) for vehicles and other systems, but is especially (but not exclusively) suited for aircraft. This invention provides embedded software diagnostics capability on numerous hardware devices and operating systems, and system avionics integration for determining the health of the system during in-flight real-time system operations. By implementing parametric data input from high-frequency and low-frequency sensors and XOR parametric-BIT comparator fusion, the system has the capability to analyze quantitative sensor input, develop sophisticated fault and false alarm confidence measures, and identify and analyze BIT failures while maintaining valid system health management and diagnostic capabilities.

Figure 11:
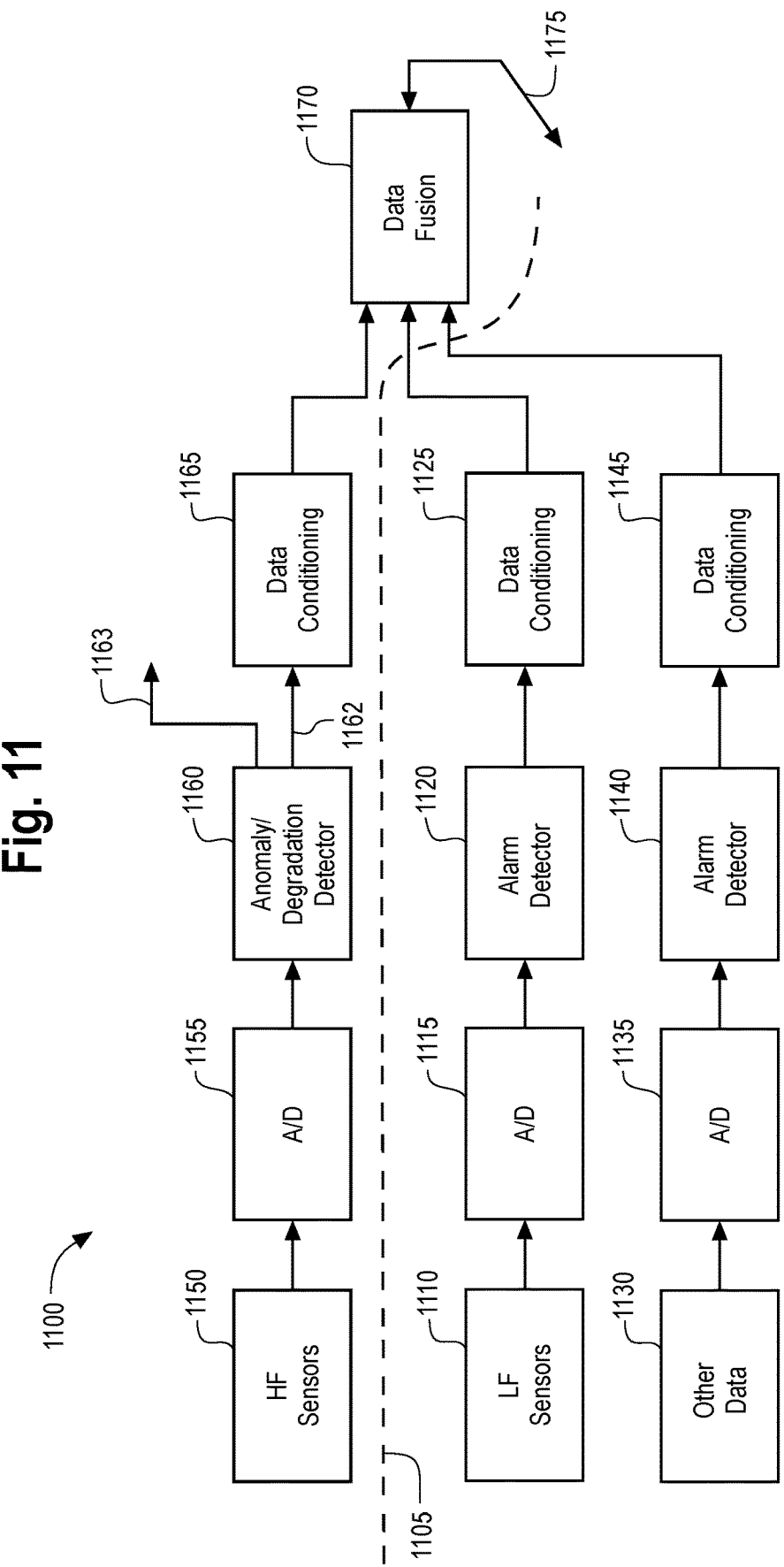
FIG. 11 is a block diagram of an embodiment of the Data Message Interface in which high-frequency and low-frequency sensor data is processed and integrated.

FIG. 11 is a block diagram of an embodiment 1100 of the Data Message Interface 108 (FIG. 2) in which both high-frequency and low-frequency sensor data are processed and integrated together. The dashed line 1105 separates the high-frequency sensor data processing components shown above the line 1105 from the low-frequency sensor data processing components shown below the line. The low-frequency sensor data processing represents a conventional approach. Low-frequency sensors 1110 provide a relatively low data rate output and may be associated with sensors for pressure, temperature, volume, flow, voltage, current, etc. Such sensor output is typically associated with an analog voltage which is converted into a digital signal by the analog-to-digital converter (A/D) 1115. Of course, if a direct digital output is provided by the sensor, it does not need to be processed by the A/D converter 1115.

The digital signal representations of the sensor outputs are supplied as inputs to the alarm detector 1120 which functions to make a determination of whether an alarm condition exists. Such a determination is based on a comparison of whether the digital value of the sensor output is within a fixed window of values defined by static, stored, upper and lower threshold values associated with each respective sensor. Such a comparison can be made by a microprocessor comparing the sensor value with the corresponding threshold values, or could be made by dedicated circuitry, e.g. integrated circuit comparators. If the value of the sensor output is within the respective window, the functioning of the component's parameter being sensed is determined to be within an acceptable range, i.e. no alarm condition. If the value of the sensor output is outside the respective window, functioning of the parameter is determined to be not within an acceptable range, i.e. an alarm is needed. If a sensor window is relatively wide (low and high threshold values are far apart), an extreme or unusual, but abnormal, operating condition may cause the parameter being sensed to exceed such a window and thereby cause alarm. This corresponds to a false positive. The wide window allows for most signals to register as alarms, especially noisy signals, while the system may be functioning properly. This is generally the case in pre-flight testing when components and sensors are achieving normal steady state. The time internal for steady state can be up 30 minutes for certain systems such as Radars. As steady state is achieved false alarms are significantly reduced. Current methods require a long schedule and budget to achieve an understanding of remaining false alarms and an acceptable static lower and upper threshold for each sensor. Our MBR Engine implementation reduces this effort and budget by 90% within two test flights. True False Alarms are easily identified. True Faults can then be worked upon for maintenance (repair or replacement). Persistent false positives (above upper threshold) are an indication that the corresponding sensor has failed. A zero sensor raw value represents an electrical short circuit in the sensor. If the sensor window is set to relatively narrow (low and high threshold values closer together) to accommodate a sensor output corresponding to extreme or unusual operating conditions so as to minimize false alarms, there is a risk that the parameter being sensed may be operating with an unacceptable characteristic that will not be determined to be an anomaly/alarm condition because the sensor output lies outside the narrow window. This corresponds to a false negative. False negatives indicate that possible real anomalies have missed alarm registration and tagging that would otherwise be processed in the detection cycle for causal analysis. Hence, there are challenges in establishing a window with fixed upper and lower threshold values.

The output from the alarm detector 1120 consists of the input digital sensor values with respective digital tags indicating alarm or no alarm. This provides an input to data conditioning 1125 which provides data formatting and alignment. Since the digital output from different sensors may have a different number of digits or may have different ways of encoding values, data formatting converts these values into standardized data representations and formats (i.e., floats, integers, binary bits, etc.), as well as padding of digits of data as necessary. Also, because the sensor data rate (frequency) will typically differ for different sensors, converting each sensor data stream into a data stream having a common data rate, e.g. 50 Hz, makes it easier to integrate and process the information from such a variety of sensors and data branches. The data conditioning 1125 can be implemented on a microprocessor which can make formatting changes to provide conformity of the expression of the sensor values, and can also utilize a common clock to establish time synchronized signals into a single common data rate for the respective digital sensor outputs which may require either up-sampling or down-sampling of each sensor data stream to convert it to the target common data rate, e.g. 50 Hz.

The other data 1130 represents other information obtained from sensors or monitoring such as hardware and software BIT, system fault codes, warnings, cautions, advisories, meteorological, and biological (heart rate, etc. of the vehicle operator, e.g. pilot) data. Signals associated with this information are further processed by the A/D converter 1135, alarm detector 1140, and data conditioning 1145 which perform similar functions as explained above for the corresponding A/D converter 1115, alarm detector 1120, and data conditioning 1125, respectively.

The high-frequency sensors 1150 provide high data rate analog information and may for example include sensors such as, stress gauges, strain gauges, accelerometers, vibration sensors, transducers, torque gauges, acoustics sensors, optical sensors, etc. Such sensor outputs are converted to a digital signal representation by A/D converter 1155 and are input to the anomaly/degradation detector 1160 (see FIG. 12 and text for a more detailed description) in which functions to make determinations of whether each of the sensor data streams represents an anomaly and/or degradation condition is made. If one or both such conditions are determined to exist for a sensor value, the corresponding digital sensor data is output with embedded flag indication at output 1162 which contains real-time sensor information at a down sampled sensor date rate. Output 1163 is a raw output of the digital sensor data for all the sensors, but after having been down sampled to reduce the amount of data associated with each sensor. This output 1163 contains data for all sensors but at a down sampled (substantially lower) data rate and is intended to be utilized by additional real time processors (not shown) to provide diagnostic health determinations. The down sampled data is more manageable (smaller in size requiring less memory for storage) and easier to process, as compared to processing all of the real time sensor data and reduces the time and processing capability required for processors that perform the real time diagnostic health determinations. The data conditioning 1165 operates similarly to data conditioning 1125, except that it must process substantially more sensor data per unit of time since the high frequency sensors will typically produce orders of magnitude more data than the low frequency sensors in the same time interval. The format used by all of the data conditioners accommodates the incorporation of a flag for anomaly or degradation condition, or alarm status.

The data fusion module 1170 (see FIG. 13 for a more detailed description) maps the incoming sensor data streams within a moving time window into groups of sensor data that are correlated, i.e. where the sensor data for each sensor within one group has a mutual relationship in which a component anomaly or failure sensed by data from one sensor in the group should also be reflected by an anomaly or failure as indicated by data from other sensors in the group. For example, assume a first group consists of sensor data associated with sensors that sense the vibration of a pump, the electrical power utilized by the pump, and the flow rate produced by the pump. Also assume that the pump is suffering a degradation due to worn bearings. If the bearings are sufficiently worn, the pump will generate vibrations outside the norm; electrical power utilized by the pump may increase or have a spike in power demand at start-up due to increased friction in the worn bearings. The sensor data associated with the flow rate produced by the pump may or may not show a reduced flow outside of the norm depending upon the severity of the degradation as the pump motor tries to compensate with increased load (power) increasing the pump shaft rotation while maintaining the required flow. Eventually if this is allowed to continue the pump components will fail with torn bearings, shaft misalignment, and possibly burnt motor wire windings.

A consistency of sensor data indicating out of norm conditions from more than one sensor in a sensor group is a step in identifying the presence of an actual degradation or failure. The actual failure isolation is determined by the MBR Engine algorithms 106 (FIG. 2) when compared to the MBR model 20 (FIG. 1). Conversely, data from one sensor indicating an out of norm condition that is not verified by sensor data from another sensor in the group also indicating an out of norm condition is possibly a false alarm which may result from a temporary anomaly (random or intermittent) or that a persistent sensor out of norm condition indicates that the sensor is itself not functioning properly.

Sensor data associated with other upstream or downstream components can also be included within a group. In the above pump example, assume that the pump is controlled to produce a flow of liquid that is channeled through a component, e.g. an engine, which requires cooling. In this further example a heat sensor associated with the engine could be included within the group since a failure of the pump would also likely produce an increased engine heating that could exceed a desired operational range. Thus, it will be understood that the grouping of sensor data that are correlated can be associated with the sensed attributes for more than one component. A group of sensor data may include sensor information from a high-frequency sensor 1150, a low-frequency sensor 1110, and/or other data sensors 1130. Of course, the data from some sensors may not be included in any group and hence will be analyzed and considered individually.

The data fusion module 1170 analyzes the mapped sensor data within a time window that increments over time, either on a group basis for the sensor data included within a predetermined group of correlated sensors or on an individual basis where sensor data is not part of any group. The data fusion module 1170 makes a determination based on stored usage and operational norm information for each group/individual of sensor data of whether a tag should be associated with the group/individual sensor data, where the tag consists of one of a predetermined set of conditional codes. Each conditional code is mapped to and compared to similar fault code generated by the component. The conditional codes are then transmitted for further processing in MBR Engine 106 (FIG. 2), while the fault codes and conditional codes are stored in non-volatile memory. For example, a conditional code of "0"" indicates the sensed attributes of a component are within a normal range of operation; a "1" represents a component anomaly/failure; "2" represents a detected false positive that could be caused by the normal range of operation window for the sensor being so wide as to include an undesired operational condition; "3" represents a detected false negative that could be caused by a sensor failure or too narrow a window of normal range calibration for the sensor such that real anomaly supporting evidence misses the MBR Engine 106 detection cycle.

The sensor data along with the conditional codes are transmitted from the data fusion module 1170 to the diagnostic model-based reasoner engine 106 for further analysis. The data fusion module 1170 is implemented in software that runs on a microprocessor/computer capable of mapping the sensor data streams into correlated groups, comparing the respective sensor values against a dynamic normal window of operation having an upper and lower threshold, determining if an anomaly/fault associated with one sensor in a group is supported by a correlation of an anomaly/fault by another sensor in the group, and encoding the respective sensor data with an error code tag representative of the malfunction/fault determined.

Figure 12:
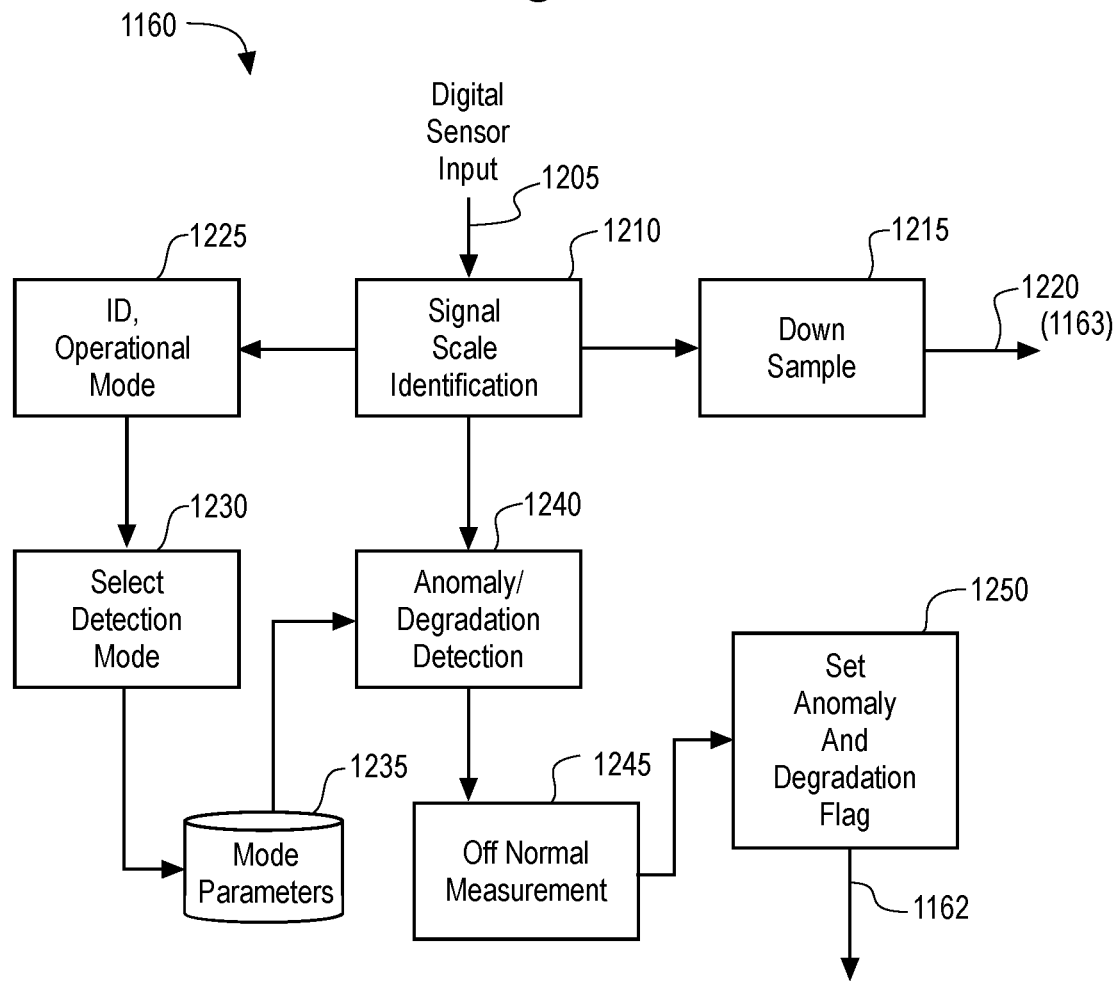
FIG. 12 is a block diagram of an embodiment of the anomaly and degradation detector of FIG. 11.

FIG. 12 is a block diagram of an embodiment of the anomaly and degradation detector 1160 of FIG. 11. This detector is preferably implemented by software running on Graphical Processing Units (GPU) such as on a system-on-a-chip that has hundreds, if not thousands, of GPU processor cores available for processing. This supports the concurrent processing of the outputs from a large number of sensors. Although the A/D converters may utilize dedicated hardware circuits, the A/D converters may also be implemented in software utilizing GPU cores. Likewise, the data conditioning module 1165 may also be implemented by software running on the GPU cores. The digital sensor inputs 1205 from the A/D converter 1155 are received as inputs by the signal scale identification module 1210 which receives the parametric values from the sensors in a dynamic/moving window of valid values and thresholds. The dynamic window of valid values is established based on historical stored normal data for the operation of the vehicle with which the sensors are associated. The raw sensor data received by the signal scale identification block 1210 is passed to the down sample module 1215 which reduces the size of the sensor data stream by eliminating substantially normal data (keeping a small amount time-stamped normal data with number of deleted duplicate data represented by this data sample). Representative out of norm parameter data are tagged with a timestamp and the number of deleted duplicate data represented by this data sample. This down sampled data stream transmitted on output 1220 allows for the re-creation of the initial data stream for non-real time off-line analysis. The identification of operational mode block 1225 analyzes the sensor data and compares it to different stored historical value ranges associated with corresponding different modes of operation of the vehicle, e.g. pre-flight, taxi, take-off, acceleration and deceleration, loitering, weapons delivery, landing, post-flight; to name a few of the modes. The select detection mode block 1230 receives an output from the identification of operational mode block 1225 which identifies a mode of operation of the vehicle. The select detection mode block 1230 causes mode parameters 1235 to identify a corresponding stored set of parameters (upper and lower thresholds, and other mode dependent factors) for each sensor that defines a normal window of anticipated values unique to that operational mode.

These parameters are transmitted to the anomaly/degradation detection module 1240 which utilizes the corresponding parameters for each sensor data stream to identify values that lie outside of the anticipated operational norms defined by these parameters. Thus, dynamic windows of normalized operation for each sensor varies depending on the mode of operation. This provides a dynamic change of normal parameters for each sensor based upon the mode of operation and thus allows a more accurate determination of whether an anomaly/degradation is being sensed because the corresponding "normal value windows" can be changed to allow for values anticipated during a specific mode of operation. Because sensor values can vary considerably depending upon the mode of operation, tailoring window thresholds and parameters for the respective modes of operation greatly enhances the ability to eliminate false alarms without having to utilize a single large acceptable range to cover all modes of operation. Off-line training based on collected and stored previous sensor data for various modes of operation allows for refinement of these window threshold values.

The off normal measurement module 1245 receives the respective sensor data from the anomaly/degradation detection module 1240. Module 1245 makes parameter distance measurements of the values associated with each sensor output relative to normal parameter values for the determined mode of operation. Based on these parameter distance measurements, the off normal measurement module 1245 makes a determination for each sensor output of whether the function being sensed by the sensor is operating within a normal mode or if an anomaly exists. If the sensor output value falls within the corresponding normal value window, a normal operation is determined, i.e. the function is operating within anticipated range of operation. If the sensor output falls outside the corresponding normal value window, and anomaly of operation is determined, i.e. the function is operating with degraded performance or failure, or problem with the sensor or its calibration exists. Refer to the tag conditional codes as explained above. Such a tag is applied to each sensor output and transmitted to the set anomaly and degradation flag module 1250. Module 1250 incorporates such a tag with each of the sensor output values which are transmitted as outputs 1162 to the data conditioning module 1165.

Figure 13:
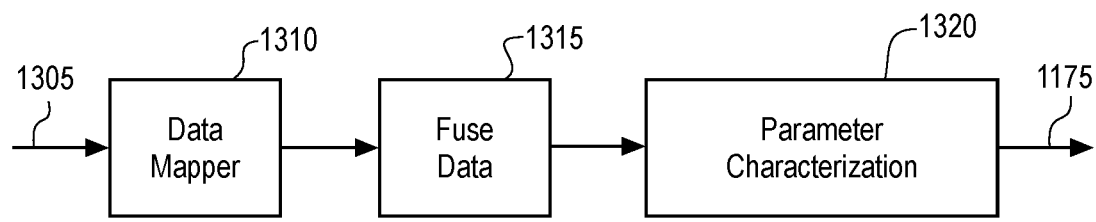
FIG. 13 is a block diagram of an embodiment of the data fusion module as shown in FIG. 11.

FIG. 13 is a block diagram of an embodiment of the data fusion module 1170 as shown in FIG. 11. The fusion module 1170 may be implemented by software running on a microprocessor-based computer. A data mapper module 1310 receives incoming streams of sensor data 1305 from data conditioning modules 1125, 1145 and 1165. This module maps or correlates the data from the incoming sensor streams so that the data from different sensors that are correlated, as explained above, are integrated into respective groups within a moving time window. That is, as the time window moves, sensor outputs occurring within that time window are those to be mapped into correlated groups. Since the incoming sensor data has been standardized to a common data rate, the time within each time window can be selected to capture one data output for each sensor. Since the sensors that will be supplying data are known in advance and groups of sensors that are correlated can be manually predetermined, the correlation information (sets of sensors that are correlated) to can be stored in memory and utilized to route the respect of sensor outputs by the data mapper into respective correlated groups. These groups of correlated sensor outputs are input to fuse data module 1315 which analyzes the data for a correlated group of sensor outputs, including sensor outputs in the group determined to be degraded/anomalous, against a stored set of initial performance parameters for the corresponding group of correlated sensors. The fuse data module 1315 fuses or integrates the data for a correlated group of sensor outputs into a single data set that is tagged with conditional fault or anomaly codes to assist in further analysis provided by the diagnostic model based reasonor engine 106. The fused output data from the fuse data module 1315 is an input to the parameter characterization module 1320 which compares the data associated with each correlated group of sensor outputs with outputs from single sensors that are part of the respective correlated group of sensors. This comparison preferably utilizes the corresponding outputs from single sensors from a past or last state. Such a comparison with a past output sensor state is useful for showing and predicting future states that may indicate off-normal behaviors or at least trending towards off-normal behaviors. The results of such comparisons are stored in a queue and then output as an organized set as outputs 1175 to the MBR engine 106 for further analysis. The queue allows for variable data rate output to accommodate any processing latency required in the MBR Engine 106, while managing the input data rates 1175 without loss of data (by dynamically allocating more processor RAM for queue as needed and releasing the allocated RAM when not needed).

FIGS. 14 and 15 show exemplary high-frequency sensor data 1405 and 1505 from a vibration sensor for motor bearings in a centrifugal pump for corresponding normal and defective pump bearings, respectively. The sensor output data 1405 represents vibrations from a normally operating bearing in the pump and shows repetitive amplitude variations 1410 with the larger amplitudes corresponding to states of the pump which normally give rise to slightly larger vibrations smaller amplitude variations 1415 corresponding to states of the pump that produce less vibrations. The larger amplitude variations 1410 will typically correspond to pump states in which a greater load due to compensation for fluid backflow in the impeller housing or a change in load is occurring with the smaller amplitude variations 1415 corresponding to no fluid backflow, which produces less vibrations. Both 1410 and 1415 represent steady state operation of the centrifugal pump. Note that the rotor (pump shaft) velocity remains constant over the entire shown time interval.

Sensor output data 1505 represents vibrations from a malfunctioning/defective bearing in a pump. Somewhat similar to the variations in FIG. 14, there are repetitive larger amplitude outputs 1510 interspersed with smaller amplitude outputs 1515. However, it will be noted that the difference between the average of the smaller amplitude outputs and the average larger amplitude outputs is significantly greater in FIG. 15 then the same corresponding differences in FIG. 14. Also, an amplitude spike 1520 at the beginning of the larger amplitude output sections 1510 has a significantly higher amplitude than any of the remainder of the larger amplitude output section 1510. As time goes on, it will be noted that spike 1520A is even more exaggerated in its amplitude difference relative to the remainder of the corresponding larger amplitude section 1510. Such a vibration differential at the beginning of a pump cycle may correspond to increased friction due to worn bearings. Note also the baseline trend of the system to higher frequencies over time (e.g. increasing average slope from the start). This is an indication of the onset of degradation and misalignment of the pump shaft, and possible ultimate failure of the pump, unless repaired.

Once sensor data has been collected and stored corresponding to the normal anticipated bearing vibrations during the operation of a pump in good working order, this data can be compared/contrasted with sensor data during an in-service operation (in-flight for an aircraft) to make a determination of whether the subject pump is operating normally or is in need of maintenance or replacement. As explained below with regard to FIGS. 16 and 17, such a determination will preferably be made on the basis of information obtained from more than one sense parameter.

FIGS. 16 and 17 show exemplary high-frequency sensor data 1605 and 1705 from sensors that monitor electrical power to the centrifugal pump with a good bearing and a bad bearing, respectively. The sensor output data 1605 corresponding to power consumed by the pump with good bearings includes a larger magnitude section 1610 of relatively higher power consumption in the lower magnitude section 1615 with relatively low power consumption. It should be noted that the timescale in FIGS. 16 and 17 are the same but are different from the timescale associated with FIGS. 14 and 15. For example, the larger amplitude section 1610 may correspond to a time in which the pump is operational and under load with the lower magnitude section 1615 corresponding to a time interval with a lighter load or perhaps almost no load. Sensor output data 1705 corresponds to power consumed by the pump with bad bearings and includes a larger magnitude section 1710 representing higher power consumption relative to the lower power consumption as indicated by time interval 1715. However, the spike 1720 from the sensor of power being consumed represents more than an order of magnitude greater than the highest power consumption indicated during corresponding time interval 1610. Such an extreme large need for power consumption is consistent with an initial starting of the pump (or of a pump cycle) with a bad bearing where the bad bearing causes an especially high initial resistance to get the rotating part of the pump in motion.

The fusion of the data from the pump vibration sensor with the pump power sensor leads to a high reliability determination of whether the bearing of the pump is malfunctioning/degrading. Positive correlation by both a defective bearing signal 1505 and the power sensor data 1705 results in a highly reliable determination that the associated pump, at a minimum, needs maintenance or perhaps replacement. Conversely, without a positive correlation from two or more sensor signals, it is possible that only one sensor signal indicating a defect could be a false positive. Such a false positive could be the result of a temporary condition, such as a temporary change in operation of the vehicle or transient electrical interference. Alternatively, a lack of positive correlation could also indicate the sensor associated with the detection of the malfunction being itself defective or perhaps going out of calibration.

Figure 18:
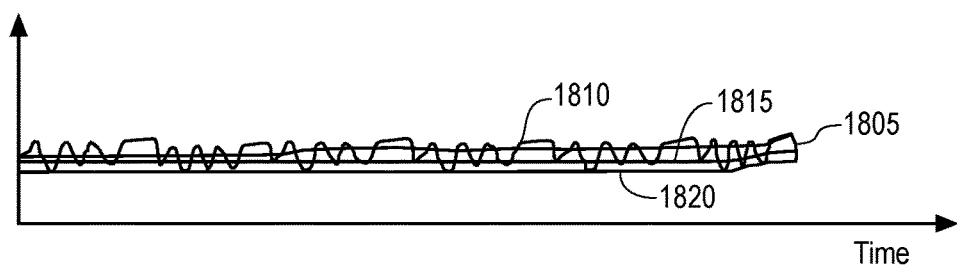
FIGS. 18, 19, 20 and 21 are exemplary graphs showing high-frequency sensor signals and derived sensor signal averages utilized for dynamic anomaly recognition.

FIGS. 18, 19, 20 and 21 are exemplary graphs showing high-frequency sensor signals and derived sensor signal averages utilized for dynamic anomaly recognition. This technique is independent of and performed in addition to the operation-based mode of processing, but both occur in parallel in Anomaly/Degradation Detection 1160. Only parameter anomaly tags with other information described below are forwarded to the Data Fusion 1170. It should be noted that timescale (horizontal axis) for these graphs are not the same as these graphs are presented to assist in explaining how different moving averages are utilized for dynamic anomaly recognition. In FIG. 18 the output 1805 from a high-frequency sensor forms the basis for a series of three different moving averages with respective short, medium and long timescale durations. In this example, the shorter timescale average 1810 is substantially shorter than the medium timescale average 1815 which is shorter than the long timescale average 1820. Timescale durations refers to the number of sensor data values utilized to calculate corresponding short, medium and long moving averages. The number of values may vary depending on the sensor data rate and the typical rate of change of sensor values. On initial data acquisition, these moving averages are dynamically set according to incoming parameter values and their rate of change in amplitudes. Medium moving average timescale duration is generally observed to be 1.5 to 2.5 times the short moving average timescale duration. The long moving average timescale duration is generally observed to be twice as large (or larger) as the medium moving average timescale duration. Note that the larger timescale duration sizes for medium and long moving averages has the effect of decreasing the magnitude (amplitude) in the resultant curves of these averages. These moving average sampling windows may be refined with off-line training on previous sensor data. These can then be statically set once enough confidence is gained on their applicability, thus reducing the computational processing power which can then be utilized for other processes. As shown in FIG. 18, the substantially consistent average magnitude of sensor output is reflected by corresponding substantially straight line short, medium and long moving averages 1810, 1815 and 1820, respectively.

Figure 19:
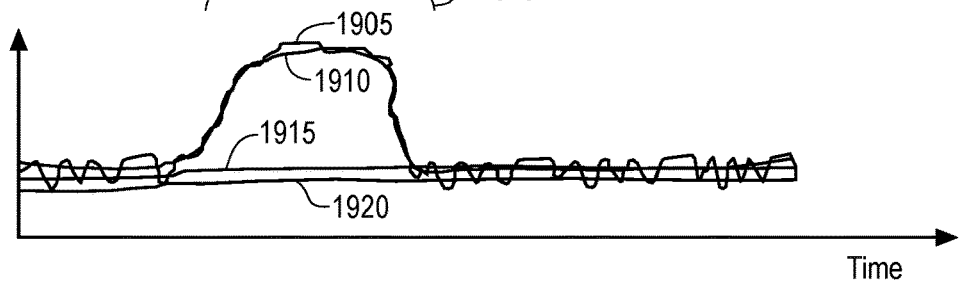

FIG. 19 shows the output 1905 for a high-frequency sensor with associated short, medium and long moving averages 1910, 1915 and 1920, respectively. In this example, there has been a substantial magnitude amplitude, short duration transient during interval 1925. Short term moving average 1910 closely tracks the sensor signal 1905 during this transient interval. However, a medium length moving average 1915 and the longer term moving average 1920 have a timescale that causes little variation of these averages during the transient interval, as shown. Such a transient could reflect a temporary (intermittent or transient) anomaly that is short relative to the moving average time interval associated with even the medium length moving average 1915. These can occur due random noise in the data due to noisy data busses, environmental effects, or some other near-neighbor mechanistic effect. This behavior is also known as a non-persistent shift in the moving averages, thus indicating a random statistical fluctuation in the signal.

Figure 20:
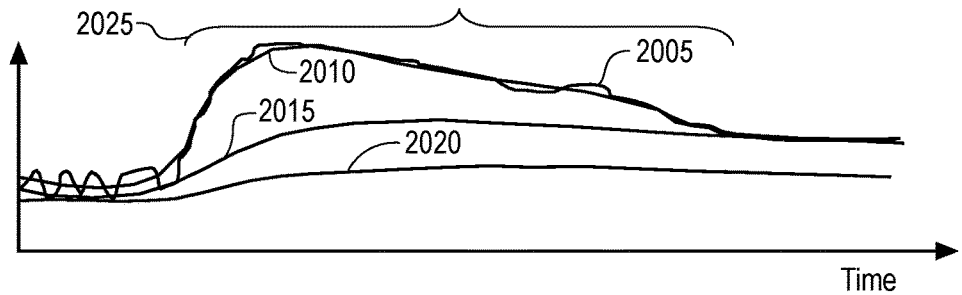

FIG. 20 shows the output 2005 for a high-frequency sensor with associated short, medium and long moving averages 2010, 2015 and 2020, respectively. This example illustrates a substantial initial magnitude change of sensor output values starting at the interval 2025. Although the initial magnitude change of the sensor output decreases by the end of interval 2025, it is still maintained at a level significantly higher than that proceeding interval 2025 (i.e., increasing slope of the baseline curve). As will be seen, the short term moving average 2010 closely tracks the sensor output values before, during and after interval 2025. However, the duration of the interval 2025 is substantially longer than the number of values used for the medium moving average 2015 such that the medium moving average 2015 begins to track towards the short term moving average 2010 so that these two moving averages substantially coincide at the end of interval 2025. Although the long moving average 2020 is slowly moving upward towards the medium moving average 2015 during the interval 2025, it will be noted that by the end of interval 2025 the long moving average 2020 has still not reached the value of the medium moving average 2015. Although the long moving average 2020 will eventually converge with the medium moving average 2015 (assuming the sensor output value remains a relative constant at the end of the interval 2025), it will take a substantial number of moving average rollover calculations for this to occur depending upon the difference between the number of sensor values utilized in the medium and long moving averages. The fact that the baseline slope is slowly increasing during large samplings (large number of sequential moving average calculations) of the parameter values indicates an off-nominal behavior, i.e., a persistent-shift in the moving averages (note in all curves). This is registered (tagged) as an anomaly as well as a degradation event in the corresponding parameter data. The component corresponding to these moving averages has not failed and can still be used but is in a degraded state (i.e., the operating conditions must be adjusted to lower values in order to attain steady state). At some point in the near future, however, this component may be repaired or replaced for full normal performance of the component.

Figure 21:
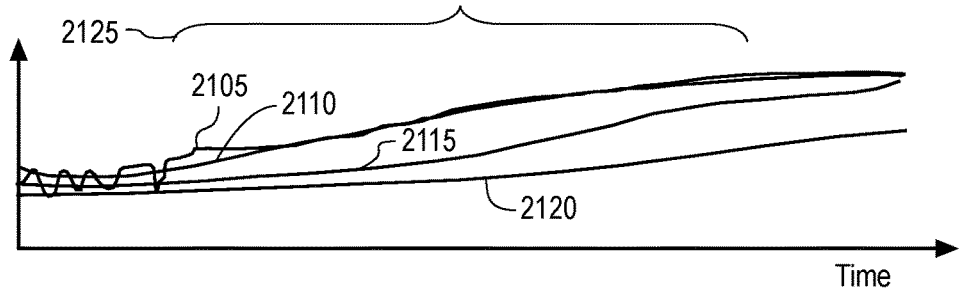

FIG. 21 shows the output 2105 for a high-frequency sensor with associated short, medium and long moving averages 2110, 2115 and 2120, respectively. In this example, the sensor output value 2105, beginning at interval 2125, undergoes a steady rate of increase in values until it reaches a substantially off-nominal value at the end of interval 2125. As expected, the short moving average 2110 closely tracks the values of the underlying sensor values 2105. The medium length moving average 2115 (medium sampling window) begins to climb towards the short moving average 2110 but does not reach the value of the short term moving average 2110 until after the end of interval 2125. As expected, the long moving average 2120 slowly begins to move upward towards the medium moving average 2115 but, by the end of the graph as shown, has not reached the same value as the medium moving average 2115. This example illustrates a persistent change (persistent shift in moving averages) of sensor output values moving from values shown prior to interval 2125 to new relatively off-nominal moving averages at the end of interval 2125. This example illustrates a near-failing component. It must be repaired or replaced very soon, i.e. preferably upon return of associated vehicle to a depot. The baseline slope is increasing continuously without a downturn and sharply. If this is a critical component, vehicle safety is comprised if vehicle operations continue as is. The operator of the vehicle should return to base. The parameter data is tagged as a critical anomaly (for a critical component) with an alarm that will be processed immediately by the MBR engine 106 and information displayed to pilot or transmitted to ground based pilot (assuming the vehicle is an aircraft) for immediate action.

Figure 22:
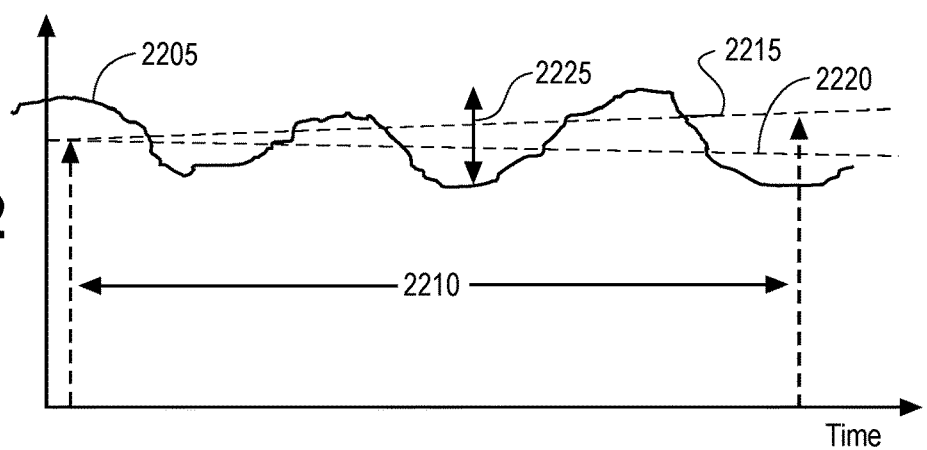
FIG. 22 is an exemplary graph of a high-frequency sensor signal with derived mathematical functions also utilized for dynamic anomaly recognition.

FIG. 22 is an exemplary graph of high-frequency sensor values from which is derived criteria that is utilized to assist in dynamic anomaly recognition. This exemplary graph provides a visual representation showing criteria determined over a moving data window 2210 based on the underlying sensor values 2205. These criteria provide a standard for determining whether an alarm should be implemented for the corresponding function sensed by the associated sensor values. Line 2215 represents the slope (s) of the data values contained within the window 2210. Line 2220 represents the arithmetic mean (u) of the data values contained within the window 2210. The vertical line 2225 is a visual representation of the standard deviation (sd) for the data values contained within the window 2210. Generally, an alarm should be set when:

$|s|<0.0167$ and $sd/u<1/6$

This technique accommodates the verification of persistent shifts in sensor output values as well as determining alarm coefficients, i.e. when alarm should be determined. The technique is based on a low probability with Gaussian distribution statistics of determining a consistence value greater than six standard deviations, as normalized by the mean. It will be noted that the standard deviation is normalized by the mean to accommodate different sensor output values. In comparison with FIGS. 18-21, it is noted that normalized signals with moving mean averages (FIG. 22) produce smaller slopes "s" for persistent shifts in moving averages, and smaller values in sd/u. This produces the necessary conditions (as given above) for generating alarms.

Figure 23:
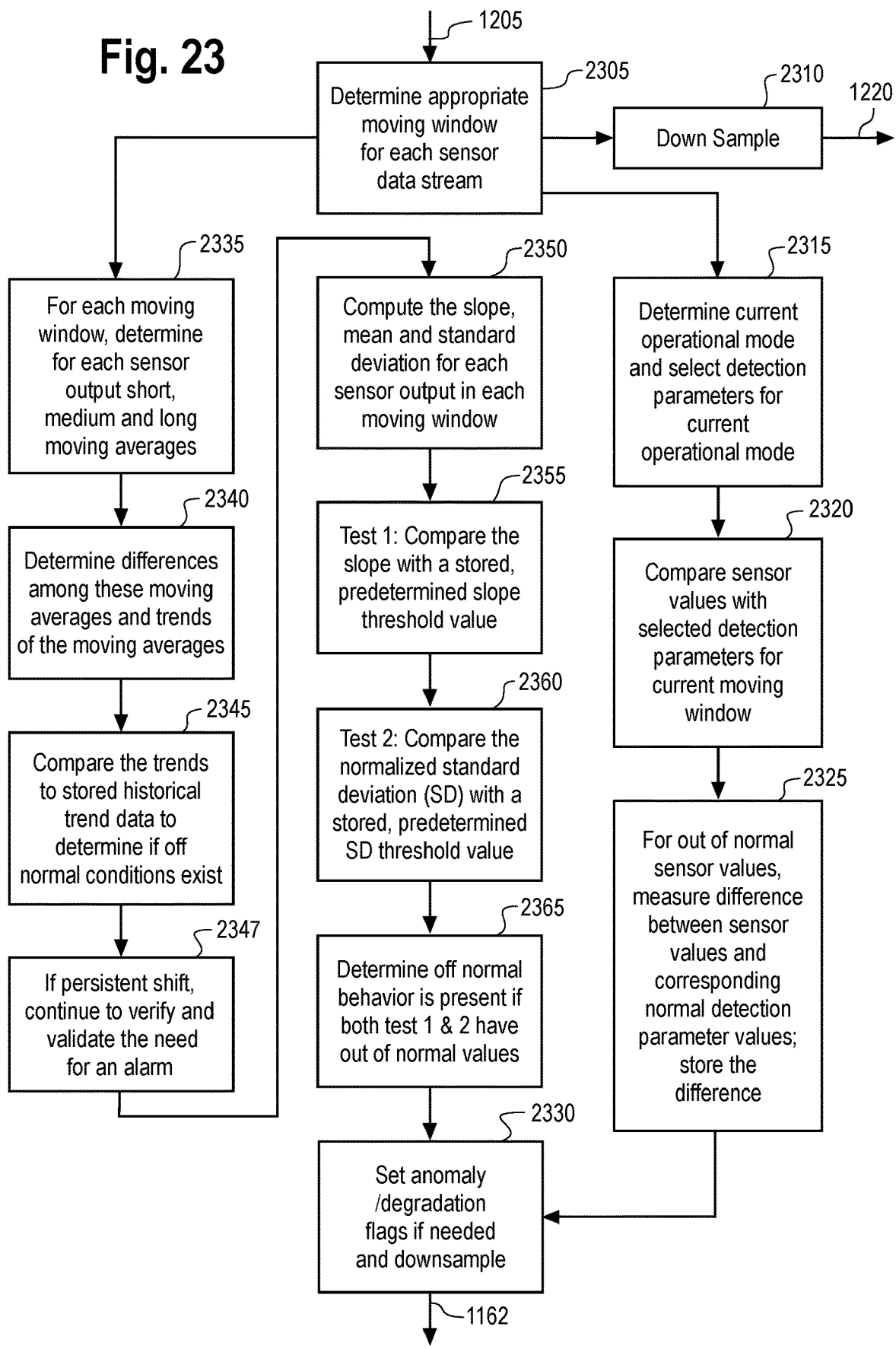
FIG. 23 is a flow diagram of exemplary steps that can be utilized to implement the anomaly/degradation detector of FIG. 12.

FIG. 23 shows a flow diagram of exemplary independent and parallel steps that can be utilized to implement the anomaly/degradation detection of FIG. 11. The stream 1205 of digital outputs from the sensors is received as an input to step 2305 which determines an appropriate moving window for the data associated with each sensor. Each of the sensors will be outputting data at a fixed data rate although the output data rates for the various sensors may be different. Since the output data for each sensor is uniquely identified for that sensor, a known data rate for each sensor can be stored in memory and then retrieved to assist in determining an appropriate moving data window, i.e. the number of sensor output values to be grouped together to form a series for analysis. Following step 2305, the digital sensor data stream is down sampled at step 2310 to minimize the quantity of data transmitted on output 1220. Often, when an anomaly is flagged, the same anomaly will be present over a series of moving data windows. The down sampling can consist of counting the number of consecutive moving data windows that each have the same anomaly for a given sensor output and then encoding the counted number of data frames/windows with the data associated with the last of the consecutive moving data windows with the same anomaly so that the original data can be reconstituted if desired by merely replicating the associated data of the counted number of times. This procedure is also utilized for nominal data to reduce its output size. It is anticipated that this information will be used in both real time for prediction of a future state/value of the component and in a non-real time environment such as for maintenance analysis performed at a maintenance location. The output 1220 may be transmitted such as wirelessly to the ground control station and/or maintenance location or may be stored locally in non-volatile storage and later transferred from storage to the maintenance location or retrieved from vehicle by a connected hand held device running the PMD Viewer.

In step 2315 a determination is made of the current operational mode and corresponding stored parameters for the operation mode are selected. For an aircraft, the current operational mode could be takeoff, normal acceleration, combat, acceleration, cruising in the steady-state speed, landing, etc. this information can be determined such as from a flight plan stored in memory or from analysis of the sensor data that reflect the mode of operation, e.g. weight on wheels, accelerometers, speed, rate of change of altitude, etc. Stored predetermined criteria/thresholds for such sensor data can be utilized to determine the mode of operation when compared with the current sensor tags. Detection parameters, e.g. upper and lower threshold values, or stored normal values for the determined mode of operation, associated with particular modes of operation are selected. Each of multiple anomaly detectors 1160 is connected to a set of identical existing high frequency sensors (from 1 to n sensors) in the component and implemented in one core of the GPU. Alternatively, multiple anomaly detectors 1160 can be executed in the same GPU core for different sensors from similar or differing components. The sensor thresholds and calibration information are available from supplier data and stored on the vehicle for processing against real time input vehicle data. There are sufficient GPU cores that can be used for each high frequency sensor in the vehicle.

In step 2320 the current sensor values are compared with the selected detection parameters for a current moving window. With actual measurements (real time input signal), these selected detection parameters conform to nominal operation of the component to which the sensor is attached. An artificial neural network (ANN) with input, hidden, and output layers with backward propagation may be utilized as the anomaly detection mechanism. Stored training data is organized into groups of classes and is utilized in supervisory capacity (off-line supervised learning). An n-dimension Gaussian function can be utilized for modeling each class. These are also referred to as radial basis functions (RBF). They capture the statistical properties and dimensional interrelationships between the input and the output layers. The algorithmic goal of the RBF ANNs is the output parameter "0" for nominal component behavior and "1" for an off-nominal component behavior.

In step 2325, for an output of normal sensor value, e.g. an anomaly, the difference between the sensor values and the corresponding normal detection parameters is calculated and stored. This information is useful in off-line training of sensor data and RBF function model refinement. In step 2330, data flags/tags are set, if needed, for corresponding sensor data.

In step 2335 determination is made of a short, medium and long moving averages for the output of each sensor for each moving window. The computation of moving averages is well understood by those skilled in the art will have no trouble implementing such calculations and software. In step 2340 a determination of the differences among these moving averages is made as well as the trends of the moving averages. In step 2345 the determined trends are compared to stored historical trend data to determine if off normal conditions exist. If a persistent shift (determined by discussion above) exists per step 2347, the process continues with verification and validating of the need for an alarm flag and sends corresponding sensor data to 2350.

In step 2350 the slope, mean and standard deviation for each sensor output in each moving window is computed. One of ordinary skill in the art will know how to implement such calculations in software either using a standard microprocessing unit or using an arithmetic processing unit. These calculations can also be implemented on a graphical processing unit. In step 2355 a 'test 1' is made where the slope is compared with a stored predetermined slope threshold value to determine if an off normal condition exists. In step 2360 a 'test 2' is made where the normalized standard deviation is compared with a stored predetermined standard deviation threshold value to determine if an off normal condition exists. In step 2365 off normal behavior is determined to be present if both 'test 1 and 2' have out of normal values. If needed, anomaly/degradation flags are set in step 2330 following step 2365. Also, in step 2330, the high-frequency sensor data is down sampled in order to have substantially the same data rate as the data rate received from the low-frequency sensors and the other data sensors. This facilitates easier processing and integration of the sensor data from all the sources by the data fusion block 1170.

Figure 24:
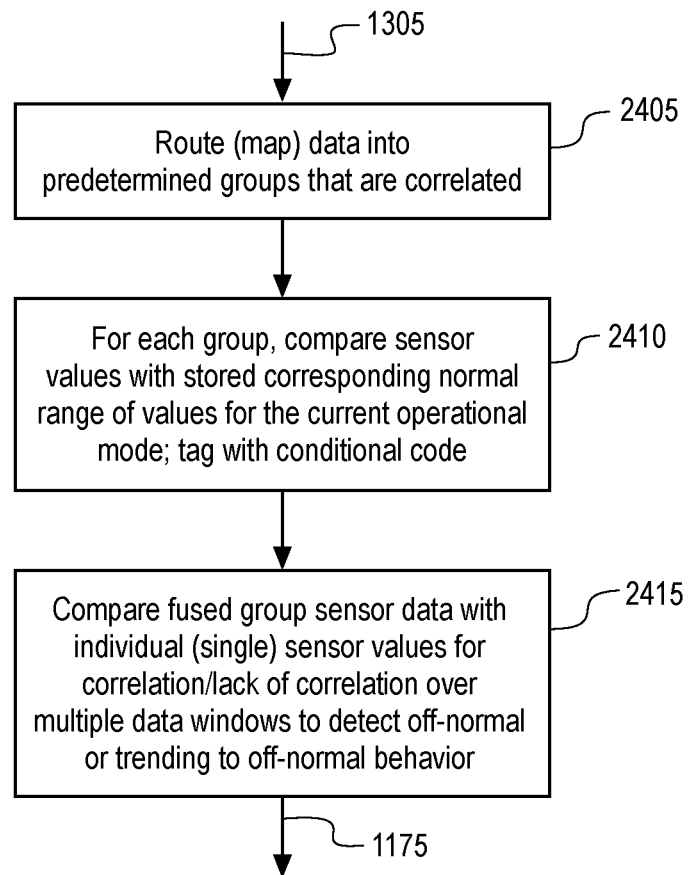
FIG. 24 is a flow diagram of exemplary steps that can be utilized to implement the data fusion of FIG. 13.

FIG. 24 shows a flow diagram of exemplary steps that can be utilized to implement the data fusion of FIG. 13. In step 2405 the incoming sensor data streams 1305 are routed (mapped) into predetermined groups in which each of the data streams within a group are correlated. The correlation of sensor data is explained above. Since each of the sensor data streams are uniquely identified and the sensors within a group that are correlated are predetermined and stored in memory, such as by manual input by a modeling engineer (FIG. 2) that identifies the sensors in each correlated group. This information is stored in memory and then retrieved to segregate the incoming data streams into correlated groups. These correlated groups may be temporarily stored in memory for individual analysis as well as correlation analysis for any faults indicated by individual sensor outputs.

In step 2410, for each of the correlated groups, the sensor values are compared with corresponding normal range of values associated with the current operational mode. Based on this analysis, the sensor data associated with a group identified to be off normal is tagged with a conditional code. In step 2415, the fused group sensor data is compared with individual (single) sensor values for correlation or lack of correlation over multiple data windows to detect off-normal or trending to off-normal behavior. For example, individual sensor data coming from one of sensors 1110 or 1130 that is correlated with a group of correlated high-frequency sensors 1150 (FIG. 11) can be useful in either confirming an anomaly or preventing a potential false alarm where the individual sensor data is not validated by other off normal sensor outputs by others in the group. Alternatively, such an individual sensor data may reflect normal operation while the corresponding group of correlated sensors from high-frequency sensors may show a trend towards an off-normal behavior. This represents a "false negative" for the individual sensor in which the single sensor data is not responsive enough to provide a warning that the subject component may require some form of maintenance.

Figure 25:
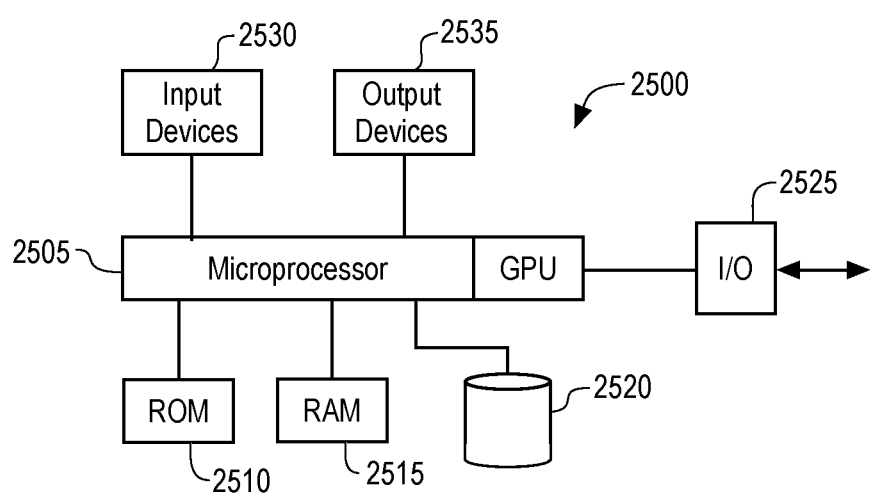
FIG. 25 is a block diagram of an exemplary computing system for implementing the high frequency sensor analysis and integration with low frequency sensor data.

FIG. 25 is a block diagram of an exemplary computing system 2500 for implementing the high frequency sensor analysis and integration with low frequency sensor data. Central to the computing system on system on chip (SOC) is microprocessor 2505 which may also include an arithmetic processing unit and/or a graphical processing unit (GPU). Alternatively, a GPU may be used by itself to process some of the computations/decisions of FIGS. 23 and 24, i.e. other than "graphical" information. A read-only memory (ROM) 2510 contains stored program instructions and data for use by the microprocessor 2505. A random-access memory (RAM) 2515 is also used by the microprocessor 2505 as a location where data may be stored and later read (the GPU also has its own RAM). A nonvolatile memory device 2520 is utilized to store instructions and/or data that will not be lost upon a loss of power to the computing system. An input/output (I/O) buffer 2525 is coupled to the microprocessor 2505 and facilitates the receipt of external data and the transmission of data from the microprocessor to external devices. Input devices 2530 represent conventional ways for a user to input information to the computing system, e.g. keyboard, mouse, etc. Output devices 2535 are conventional ways for information to be conveyed from the computer system to a user, e.g. video monitor, printer, etc. Depending on the number of parallel cores of the microprocessor 2505 (or the GPU), all cores provide sufficient computational power needed to process the data from all of the sensors in accordance with the steps explained above. For example, one core may be used to process all the data for one correlation group of sensors since all sensors in that group will have outputs that need to be stored and compared against the outputs of the other sensors in that group.

As will be understood by those skilled in the art, the ROM 2510 and/or nonvolatile storage device 2520 will store an operating system by which the microprocessor 2505 is enabled to communicate information to and from the peripherals as shown. More specifically, sensor data is received through the I/O 2525, stored in memory, and then processed in accordance with stored program instructions to achieve the detection of anomalies and degradation of components associated with the respective sensors. Based on the analysis of the sensor data as explained above, those skilled in the art will know how to implement in the computer system software to determine different length moving averages such as discussed with regard to FIGS. 18-21 over consecutive moving data windows and compare the respective values of the different length moving averages with stored threshold values for a particular mode of operation. Similarly, with respect to FIG. 22, those skilled in the art will know how to calculate in software the slope, mean, and standard deviation for sensor data in consecutive moving data windows and compare the results with stored criteria. Different thresholds and values are stored in memory corresponding to the different modes of operation of the respective vehicle. Upon determining the mode of operation, the corresponding stored thresholds and values will be utilized for comparison with the information derived from the sensors during the respective mode of operation. In contrast to utilizing just a fixed upper and lower threshold value for determining a normal range of operation for a given sensor for all types of operational conditions, the techniques described herein provide for a dynamic, i.e. changing, criteria for a given sensor to determine anomalies/degradation dependent upon changes in the sensor data and/or the mode of operation of the vehicle.

If used and unless otherwise stated, the terms "upper," "lower," "front," "back," "over," "under," and similar such terms are not to be construed as limiting embodiments to a particular orientation. Instead, these terms are used only on a relative basis.

What is claimed is:

1. A method implemented by a computing system for identifying anomalies that represents potential off-normal behavior of components on an aircraft based on data from sensors during various modes of operation of the aircraft, the method comprising the steps of:

receiving, by the computing system, digitized representations of high-frequency sensor outputs that monitor performance parameters of respective components of the aircraft;

dynamically selecting at least one of anomaly and degradation criteria for the respective high-frequency sensor outputs, the computing system automatically selecting the at least one of anomaly and degradation criteria from anomaly and degradation criteria stored in memory;

comparing, by the computing system, the digitized representations of the high-frequency sensor outputs with the respective dynamically selected at least one of anomaly and degradation criteria where result of the comparison determines whether potentially off-normal behavior exists for the component corresponding to the sensor output being compared;

inserting, by the computing system, at least one of a conditional anomaly tag and a conditional degradation tag with the digitized representations of first high-frequency sensor outputs where the respective at least one of anomaly or degradation comparisons indicate potentially off-normal behavior;

transmitting, by the computing system, the digitized representations of the first high-frequency sensor outputs which have one of the conditional anomaly tag and conditional degradation tags to a computer-based diagnostic system for a final determination of whether the component associated with the one of conditional anomaly and degradation tags represents off-normal behavior, thereby minimizing computational load on the computing system by the latter not having to process sensor outputs which do not have one of the conditional anomaly tag and conditional degradation tags.

2. The method of claim 1 wherein:
the step of dynamically selecting at least one of anomaly and degradation criteria comprises selecting anomaly criteria and includes determining first and second moving averages for each of the digitized representations of high-frequency sensor outputs;
the step of comparing the high-frequency sensor outputs against the respective dynamically selected anomaly criteria comprises comparing trends of the first and second moving averages with stored historical trend data for the respective digitized representations of high-frequency sensor outputs; and
the step of inserting the at least one of a conditional anomaly tag and a conditional degradation tag comprises inserting the conditional anomaly tag to the respective digitized representation where differences between the first and second moving averages as contrasted with corresponding stored historical trend data exceeds a predetermined threshold.

3. The method of claim 1 wherein:
the step of dynamically selecting at least one of anomaly and degradation criteria comprises selecting degradation criteria and includes determining slopes of moving averages in sequential dynamic windows of sensor data for each of the digitized representations of high-frequency sensor outputs;
the step of comparing comprises comparing trends of the slopes of the moving averages in the sequential dynamic windows with corresponding stored historical trend data for the respective digitized representations of high-frequency sensor outputs; and
the step of inserting comprises inserting the conditional degradation tag with the respective digitized representation where differences between moving averages in two consecutive sequential dynamic windows and corresponding stored historical trend data exceed a predetermined amount.

4. The method of claim 1 wherein:
the step of dynamically selecting anomaly criteria and degradation criteria each comprises selecting stored first and second predetermined values;
the step of comparing comprises determining a slope, mean, and standard deviation normalized by the mean for the digitized representation of a high-frequency sensor output for a current moving data window, and comparing the slope to the first predetermined value and comparing the standard deviation normalized by the mean to the second predetermined value.

5. The method of claim 1 wherein:
the step of dynamically selecting at least one of anomaly and degradation criteria comprises determining a current mode of operation of the aircraft;
the step of comparing comprises retrieving stored upper and lower threshold values associated with the current mode of operation from memory for each of the digitized representations of high-frequency sensor outputs, and comparing values of the respective digital representation of the high-frequency sensor outputs with the corresponding upper and lower threshold values for the current operational mode; and
the step of inserting comprises applying the conditional anomaly tag to each of the respective digitized representation of the high-frequency sensor outputs where the value of the respective digital representation of the high-frequency sensor output is not between the upper and lower threshold values.

6. The method of claim 1 further comprising:
receiving, by the computing system, digitized representations of low-frequency sensor outputs associated with respective components of the aircraft;
adjusting a data rate of the digitized representations of the high-frequency sensor outputs to be substantially equal to a data rate of the digitized representations of low-frequency sensor outputs;
formatting the digitized representations of the low-frequency and high-frequency sensor outputs so that both the low-frequency and high-frequency digitized representations have a common digital format;
mapping the commonly formatted digital representations of the low-frequency and high-frequency sensor outputs into groups of correlated sensor outputs where correlation indicates that each of the sensor outputs within a group have an interrelated hierarchy so that a failure of a component associated with a sensor output lower in the hierarchy can propagate and produce corresponding sensor output anomalies for sensors higher in the hierarchy;
determining whether at least one of a conditional anomaly and a conditional degradation exists based on at least two sensor outputs within one group being determined to have one of anomalies and degradation during a common data window.

7. The method of claim 6 further comprising storing in memory, for each sensor in a correlated group, a common group identifier that identifies all sensor outputs with a common correlation.

* * * * *